(12) United States Patent
Mertik et al.

(10) Patent No.: US 6,393,769 B1
(45) Date of Patent: May 28, 2002

(54) PORTABLE STAGE

(75) Inventors: Roy M. Mertik, Lakewood; Donald R. McCallum, Greeley; Donald J. McCallum, Louisville, all of CO (US)

(73) Assignee: Marshall Austin Productions, Lakewood, CO (US)

( * ) Notice: Subject to any disclaimer, the term of this patent is extended or adjusted under 35 U.S.C. 154(b) by 0 days.

(21) Appl. No.: 09/534,899

(22) Filed: Mar. 24, 2000

(51) Int. Cl.[7] .................................................. E04H 3/26
(52) U.S. Cl. ...................... 52/7; 52/6; 52/66; 52/646; 52/74; 296/26.12; 296/26.15; 296/26.14; 296/162
(58) Field of Search ............................ 52/66, 6, 7, 646, 52/74; 296/26.12, 26.15, 162, 26.14

(56) References Cited

U.S. PATENT DOCUMENTS

| | | | |
|---|---|---|---|
| 3,181,203 A | 5/1965 | Wenger | 20/1.126 |
| 3,217,366 A | 11/1965 | Wenger | 52/6 |
| 3,417,518 A | 12/1968 | Jaffe | 52/7 |
| 4,026,076 A | 5/1977 | Analetto | 52/6 |
| 4,232,488 A | 11/1980 | Hanley | 52/7 |
| 4,535,933 A | * 8/1985 | Kuiper | 296/22 |
| 4,949,649 A | 8/1990 | Terres et al. | 108/116 |
| 5,078,442 A | 1/1992 | Rau et al. | 296/26 |
| 5,152,109 A | 10/1992 | Boers | 52/143 |
| RE34,468 E | 12/1993 | Rau et al. | 296/26 |
| 5,327,698 A | 7/1994 | Uhl | 52/68 |
| 5,400,551 A | 3/1995 | Uhl | 52/68 |
| 5,546,709 A | 8/1996 | Decker et al. | 52/66 |
| 5,716,090 A | 2/1998 | Chang et al. | 296/26 |
| 5,848,501 A | 12/1998 | Taipale et al. | 52/126.4 |
| 5,897,158 A | 4/1999 | Henke et al. | 296/181 |
| 5,915,774 A | * 6/1999 | Tiedge | 296/26.13 |
| 5,935,675 A | * 8/1999 | Hayden et al. | 428/71 |
| 5,947,502 A | 9/1999 | Kammerzell et al. | 280/442 |

* cited by examiner

Primary Examiner—Carl D. Friedman
Assistant Examiner—Chi Nguyen
(74) Attorney, Agent, or Firm—Tejpal S. Hansra

(57) ABSTRACT

A portable stage having at least a transport configuration and a deployed configuration is disclosed. The portable stage includes a chassis having wheels rotatably attached thereto and a main floor panel attached to the chassis. First and second deployable floor panels are pivotally attached to the main floor panel, and a deployable canopy is attached to the chassis. The deployable canopy is stored between the first and second floor panels when the portable stage is in its transport configuration. When the stage is deployed, the main floor panel, first floor panel and second floor panel form a main stage, and the canopy is large enough to cover the main stage.

26 Claims, 18 Drawing Sheets

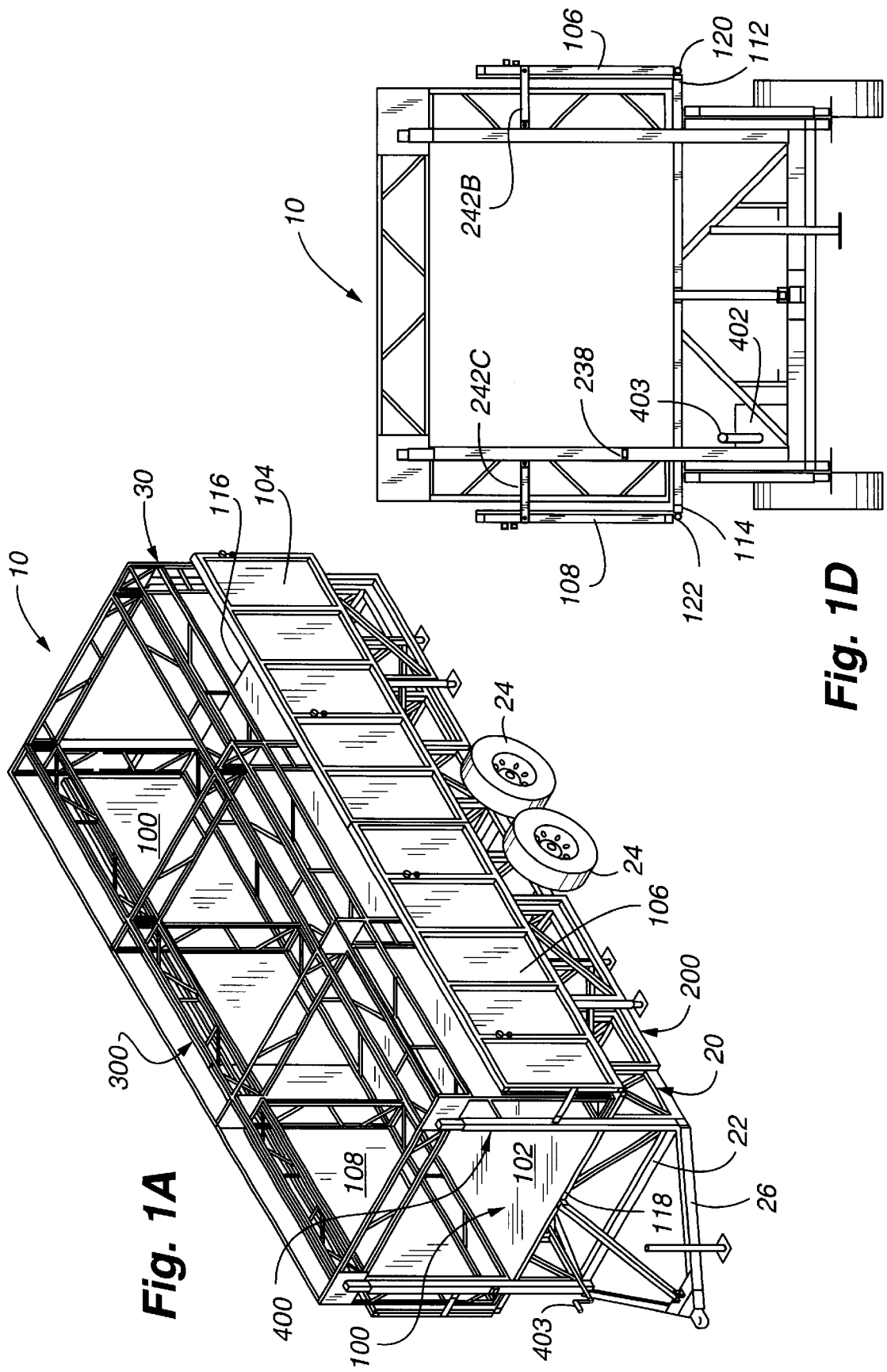

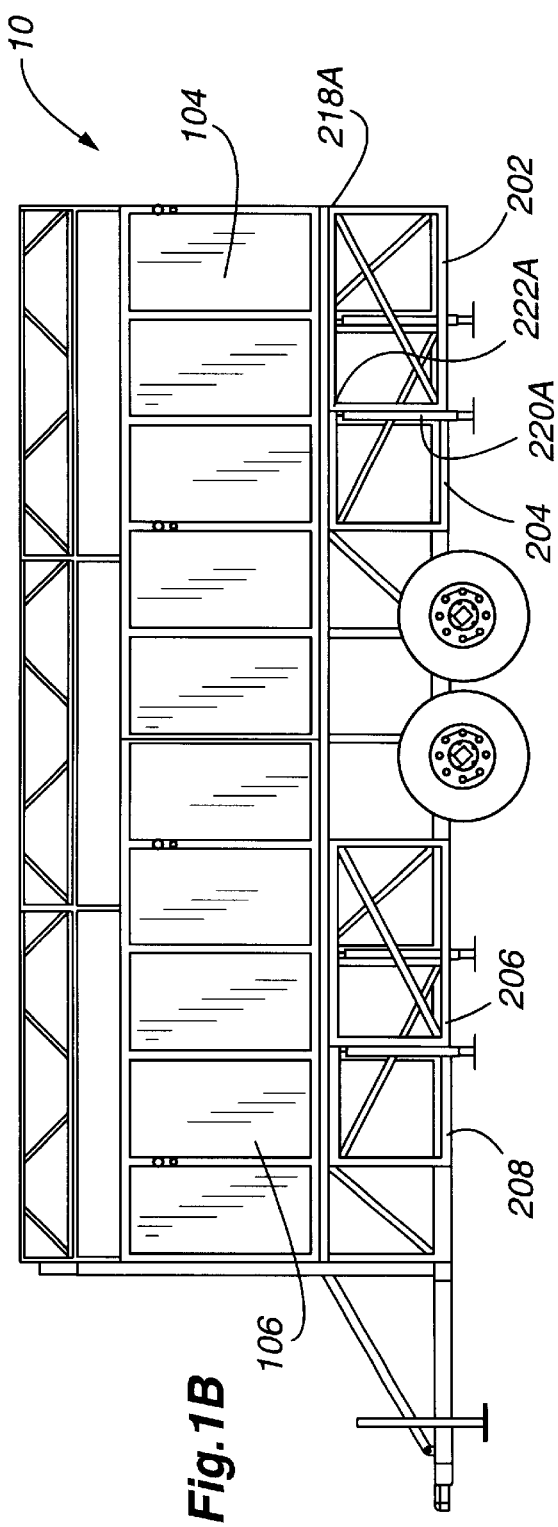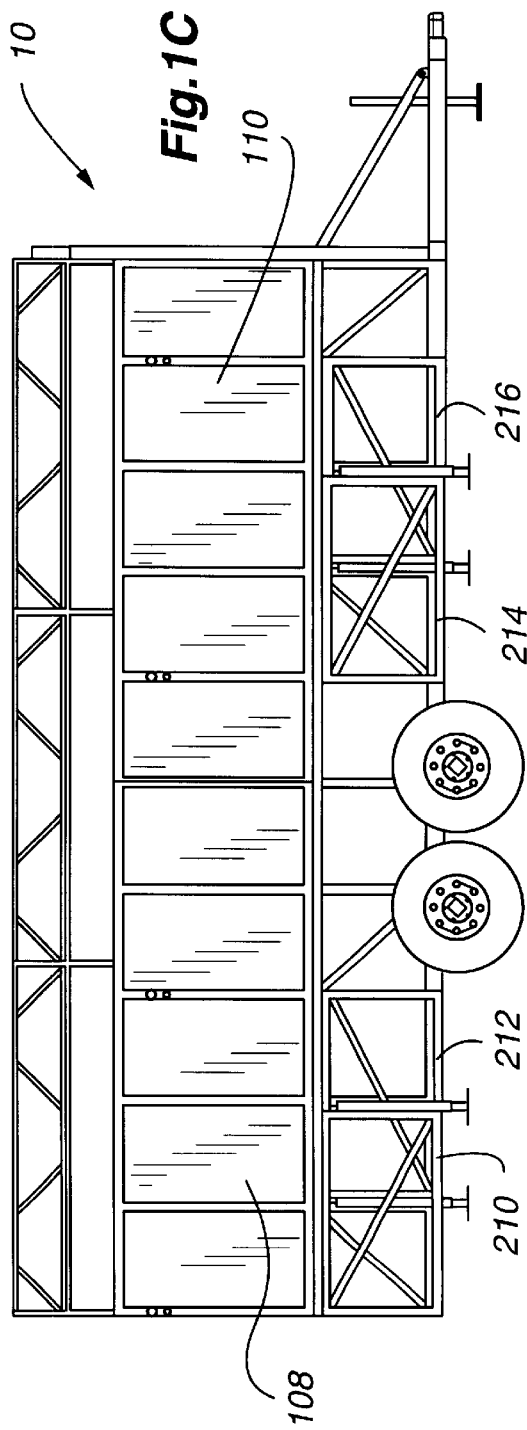

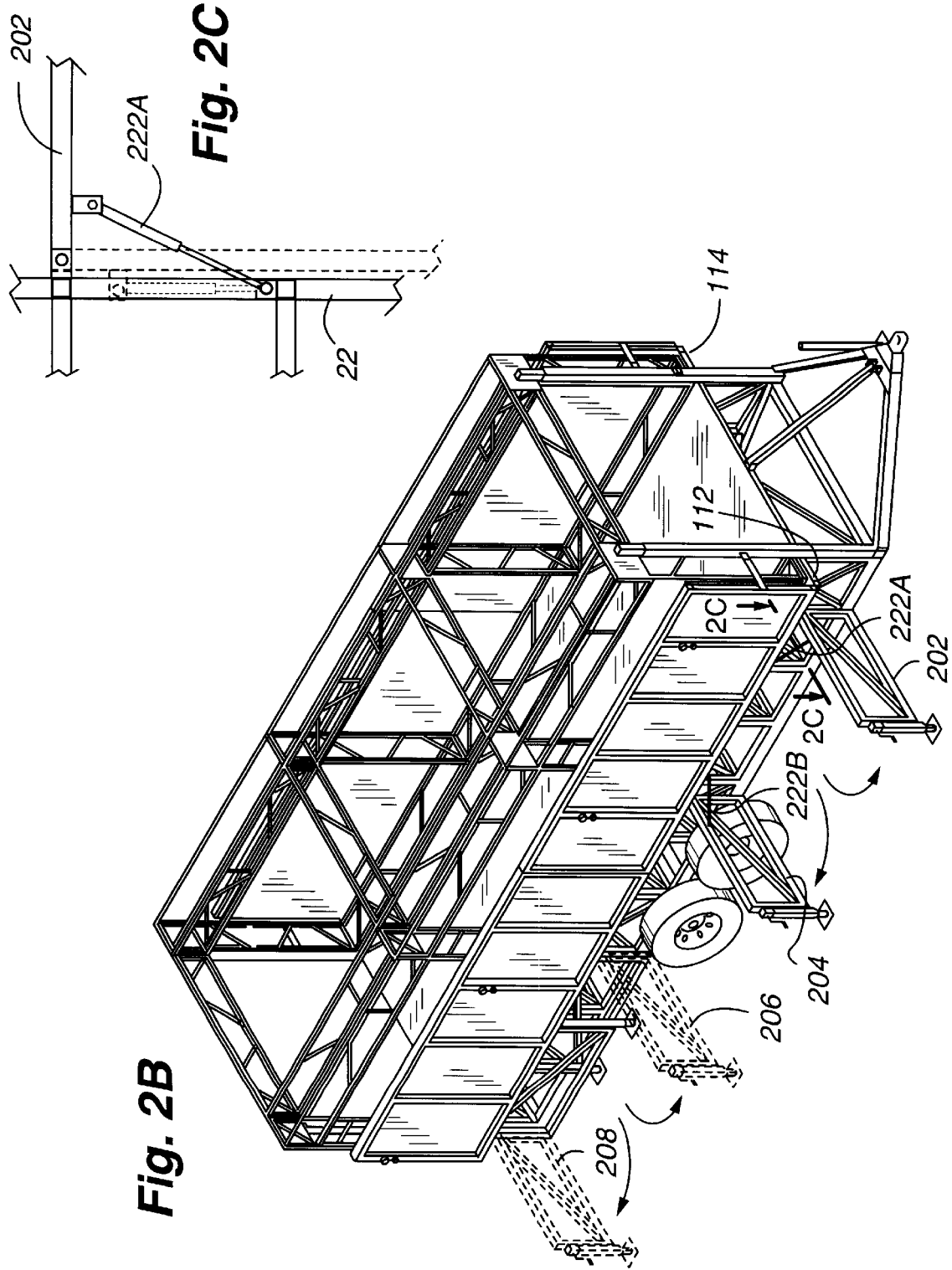

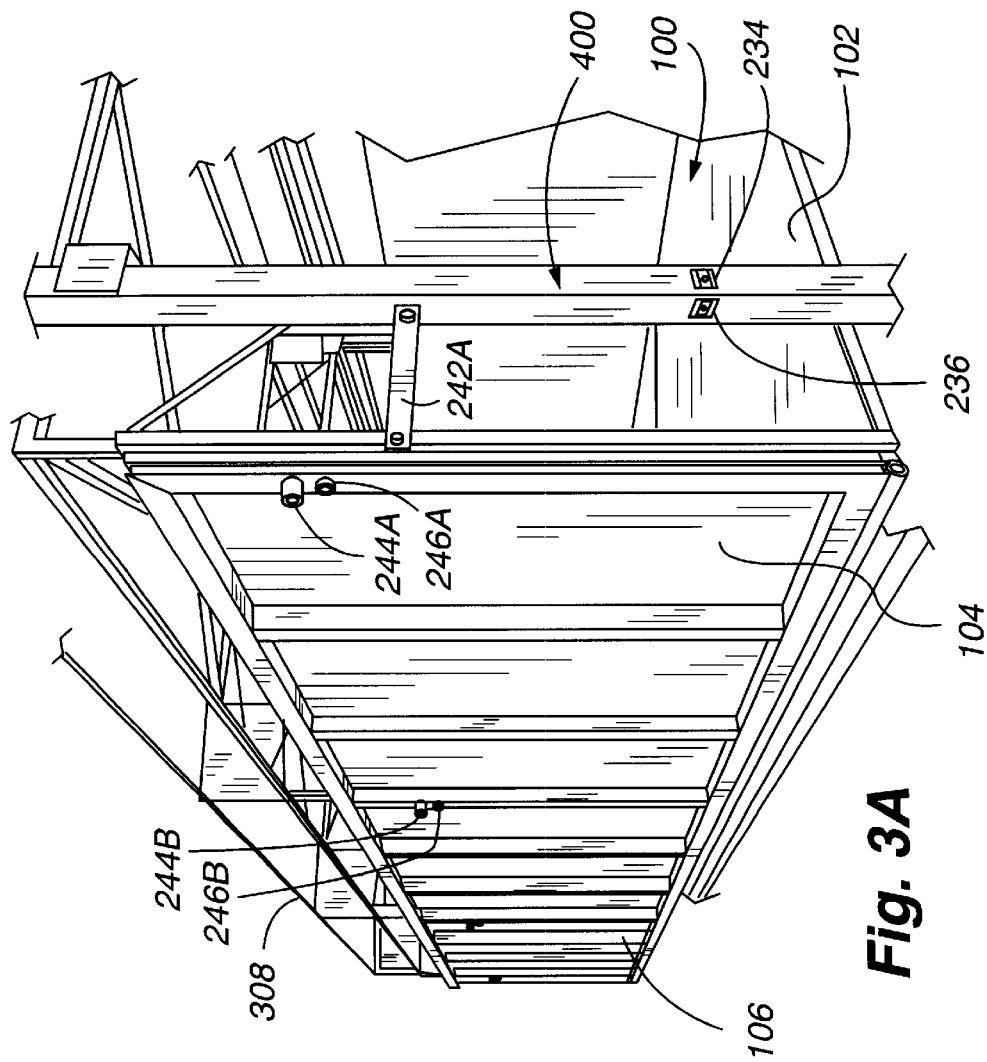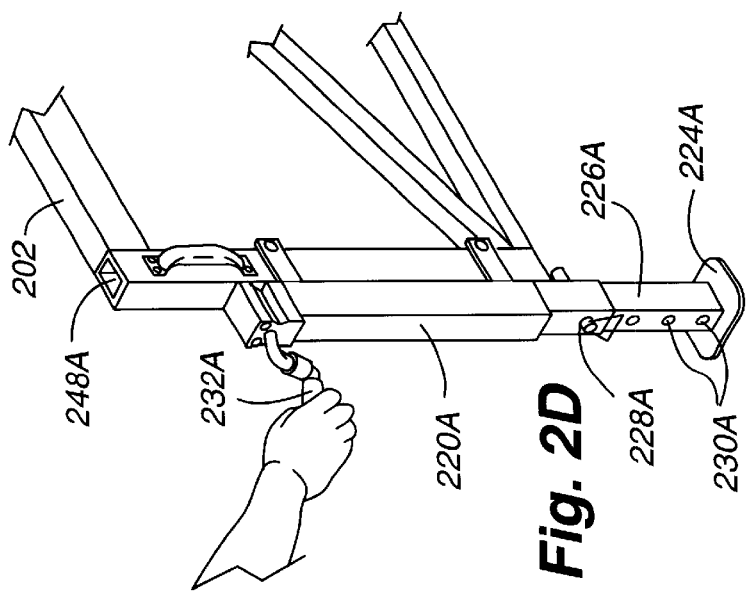

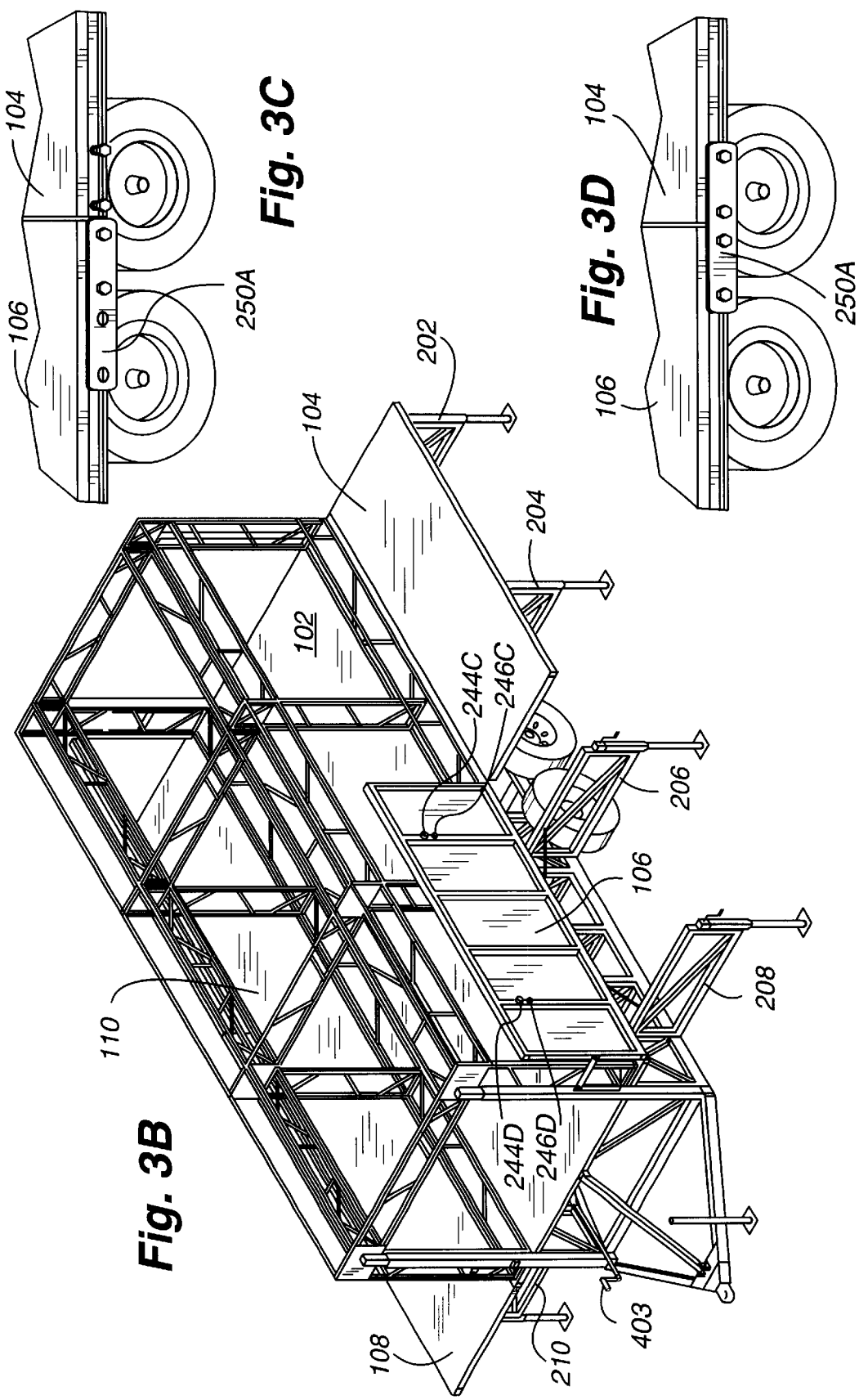

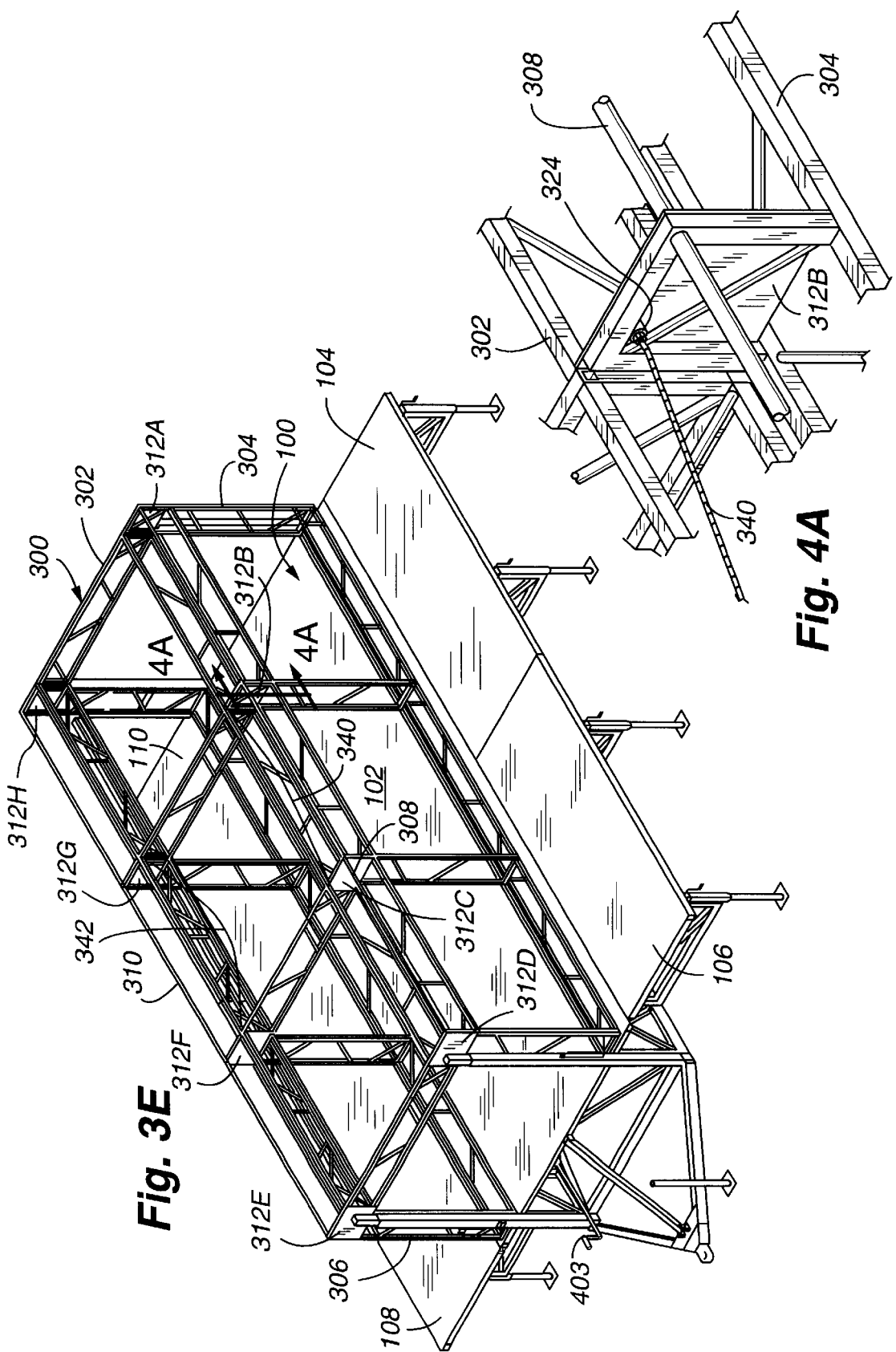

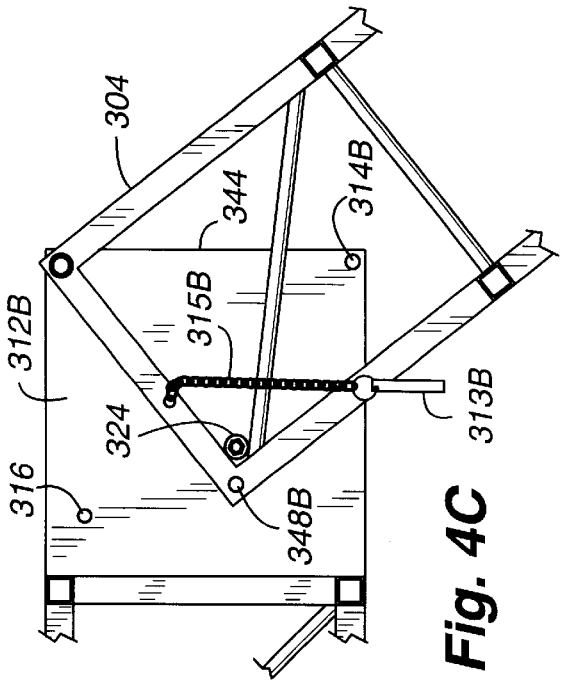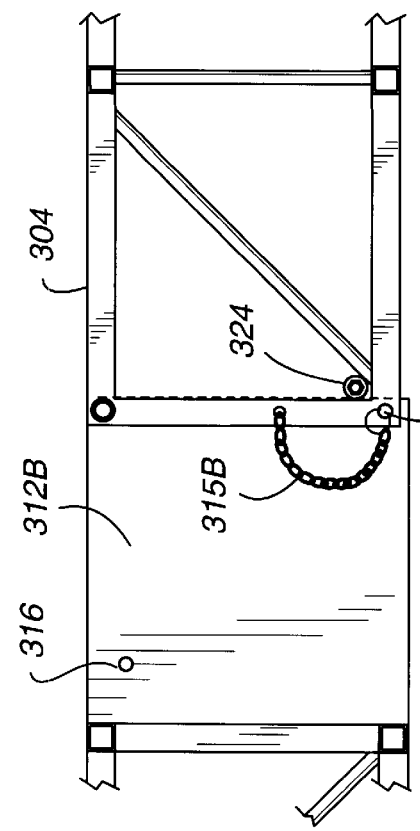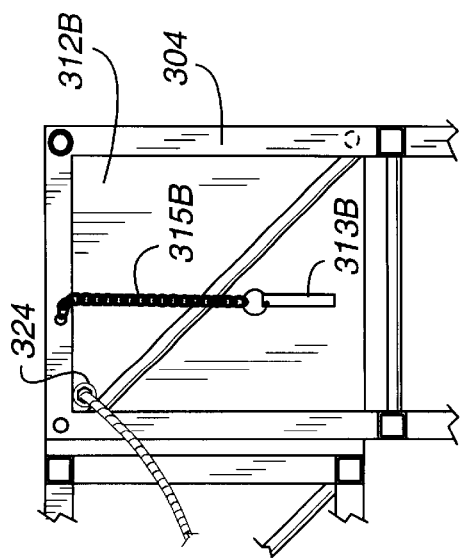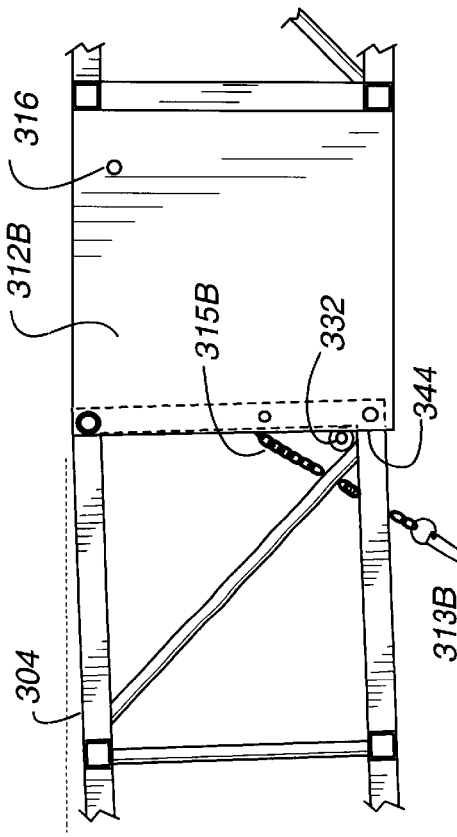

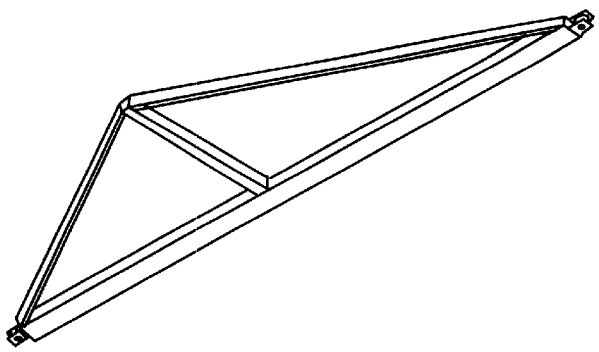
Fig. 5F
Fig. 5G
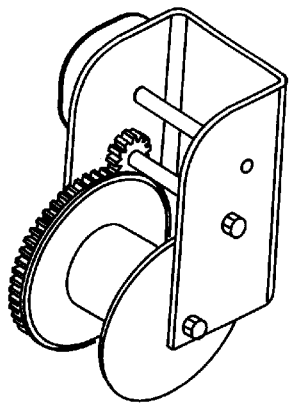
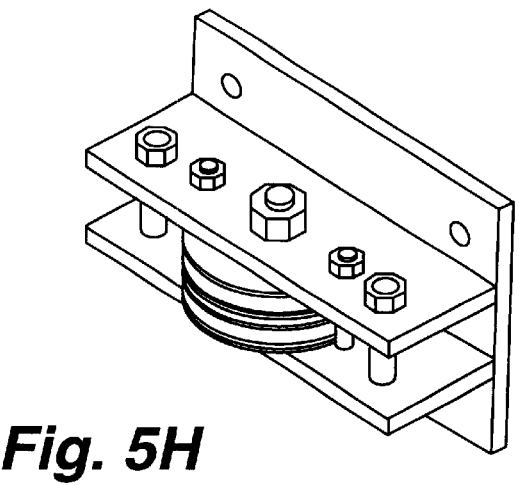
Fig. 5H

PORTABLE STAGE

FIELD OF THE INVENTION

The present invention relates to portable stages and, more particularly, to portable stages that may be towed by a vehicle.

BACKGROUND OF THE INVENTION

A variety of portable stage structures, which may be towed by vehicles, have been developed. Many of these portable stage structures include a transport configuration (i.e., a position the stage is in when it is being towed) and a deployed position (i.e., a position the stage is in when it is in use). Further, many portable stage structures include a floor (comprised of foldable floor panels) and a canopy (comprised of foldable canopy panels) for covering the floor when the floor and canopy are in their deployed positions.

In prior systems, in order to ensure that the canopy covered the floor when both the floor and the canopy were deployed, canopy panels were designed to fold over their floor panels when the stage was in its transport position. In such systems, because the canopy panels were exposed during transport, the canopy panels were designed to be extremely durable, preventing the canopy panels from being lightweight. Instead, canopy panels tended to be heavy and bulky, adding to the overall weight of the portable stage.

It would be desirable to design a portable stage having a canopy and a floor, wherein (1) the canopy includes canopy panels and the floor includes floor panels, (2) the canopy is large enough to cover the floor when the floor and canopy are in their fully-deployed positions, and (3) the canopy panels are designed to be folded between the floor panels when the stage is in its transport position. Furthermore, it would be advantageous to reduce the overall weight of the stage by constructing the canopy panels from a lightweight material, since the canopy panels would no longer be fully-exposed during transport of the stage.

In many portable stages, hydraulic systems are used to convert portable stages from their transport configuration to their fully-deployed configuration. For example, many portable stages use hydraulic systems to move their canopies from their transport configuration to their fully-deployed configuration. Unfortunately, however, hydraulic systems suffer from a number of drawbacks. Specifically, for example, hydraulic systems are highly susceptible to damage when exposed to extreme temperatures. Furthermore, hydraulic systems may leak and are relatively complex. Even further, hydraulic systems require an onboard or remote power source, which may not always be available or reliable.

Accordingly, it would be desirable to develop a mechanical, as opposed to hydraulic, system capable of deploying a portable stage from its transport configuration to its fully-deployed configuration. Specifically, it would be desirable to develop a mechanical system for deploying a canopy. Even more specifically, it would be desirable to develop a mechanical system which permits a single individual to deploy a canopy from its transport configuration to a deployed configuration. Further, it would be beneficial to develop a mechanical system which permits a canopy from being taken from a parallel configuration relative to a stage floor to an angled configuration relative to the stage floor for drainage, lighting and/or acoustical considerations.

Many portable stages are supplied with supports that are permanently attached to the flooring of the stage to support the stage when it is fully deployed. Supports which are permanently attached to the floor of the stage may make storage and transport of the flooring somewhat cumbersome. In addition, the supports may become damaged during transport or deployment.

Accordingly, it would be desirable to provide a floor support mechanism that is removably attached to the flooring and which makes transport and storage of the flooring more convenient and less susceptible to damage. In addition, it would be desirable to provide flooring and a corresponding floor support mechanism that is safe during set-up, tear-down and transport of the stage.

SUMMARY OF THE INVENTION

The present invention is designed to overcome the aforementioned problems and meet the aforementioned, and other, needs.

A portable stage having at least a transport configuration and a deployed configuration is disclosed. In one embodiment, the portable stage includes a chassis having wheels rotatably attached thereto and a main floor panel attached to the chassis. First and second deployable floor panels are pivotally attached to the main floor panel, and a deployable canopy is attached to the chassis. The deployable canopy is stored between the first and second floor panels when the portable stage is in its transport configuration. When the stage is deployed, the main floor panel, first floor panel and second floor panel form a main stage, and the canopy is large enough to cover the main stage.

In another embodiment, the portable stage includes a chassis having wheels rotatably attached thereto and a main floor panel attached to the chassis. First and second deployable floor panels are pivotally attached to the main floor panel, and a deployable canopy is attached to the chassis. The canopy includes a main canopy panel, a first canopy panel and a second canopy panel, wherein said first and second canopy panels are pivotally connected to the main canopy panel and wherein the first and second canopy panels respectively have first and second spring pins. The main canopy panel includes first and second canopy panel securement plates which cooperate with first and second spring pins to both lock the canopy in its transport configuration and place the canopy in a semi-deployed configuration.

In yet another embodiment, the portable stage includes a chassis having wheels rotatably attached thereto and a main floor panel attached to the chassis. First and second deployable floor panels are pivotally attached to the main floor panel, and a deployable canopy is attached to the chassis. First and second stabilizer beams are pivotally attached to the chassis and are stored under the main floor panel when said portable stage is in its transport configuration. The first and second stabilizer beams may be deployed by being pivoted out from under the main floor panel. Gas struts may be used to position the stabilizer beams. Furthermore, first and second stabilizer beams include apertures for correspondingly receiving stabilizing pins located on first and second floor panels to secure first and second floor panels once they have been deployed.

In yet a further embodiment, the portable stage includes a chassis having wheels rotatably attached thereto and a main floor panel attached to the chassis. First and second deployable floor panels are pivotally attached to the main floor panel. The portable stage also includes a deployable canopy having a main canopy section, which may be lifted relative to the main floor panel. First, second, third and fourth sleeves are fixedly secured to the chassis, wherein the first, second, third and fourth sleeves respectively receive first, second, third and fourth extension beams which are secured to the main canopy panel. The first, second, third and fourth extension beams permit the main canopy panel to be parallel to the main floor panel when in a transport configuration and tilted relative to the main floor panel when in a deployed configuration.

Other embodiments, objects, features and advantages of the invention will be apparent from the following specification taken in conjunction with the following drawings.

BRIEF DESCRIPTION OF THE DRAWINGS

FIG. 1A illustrates a perspective view of one embodiment of the portable stage of the present invention in its transport configuration;

FIG. 1B illustrates a first side view of the embodiment of the present invention shown in FIG. 1A;

FIG. 1C illustrates a second side view of the embodiment of the present invention shown in FIG. 1A;

FIG. 1D illustrates a front view of the embodiment of the present invention shown in FIG. 1A;

FIG. 2B is a perspective view of one embodiment of the present invention illustrating deployment of the stabilizer beams;

FIG. 2C is a partial view along line 2C—2C illustrating a gas strut connected between the chassis and a stabilizer beam, wherein the gas strut is used to position the stabilizer beam;

FIG. 2D illustrates a partial perspective view of a stabilizer jack which is used to support the stage when the stage is in its deployed configuration;

FIG. 3A illustrates a partial perspective view of the portable stage of FIG. 1A;

FIG. 3B is a perspective view of one embodiment of the portable stage of the present invention illustrating three of the four floor panels in their deployed configuration;

FIG. 3C illustrates a partial perspective view of the first and second floor panels, wherein the floor panel joiner bar is not attached to both the first and second floor panels;

FIG. 3D illustrates a partial perspective view of the first and second floor panels, wherein the floor panel joiner bar is attached to both the first and second floor panels;

FIG. 3E illustrates a perspective view of one embodiment of the portable stage of the present invention with the four floor panels deployed and the canopy in its transport configuration;

FIG. 4A illustrates a partial perspective view along lines 4A—4A of FIG. 3E illustrating second canopy panel securement plate, first spring pin release wire, first spring pin assembly and first canopy pivot shaft;

FIG. 4B illustrates a first side view of FIG. 4A showing the canopy panel securement plate when the first canopy panel is in its transport configuration;

FIG. 4C illustrates a first side view, similar to FIG. 4B, of the canopy panel securement plate when the first canopy panel is in an intermediate position;

FIG. 4D illustrates a second side view, opposite the first side view of FIGS. 4B and 4C, of the canopy panel securement plate when the first canopy panel is in a semideployed position;

FIG. 4E illustrates a first side view, similar to FIGS. 4B and 4C, of the canopy panel securement plate when the first canopy panel is in a fully-deployed configuration;

FIG. 5F illustrates a perspective view of a bell crank assembly for the canopy lifting mechanism of one embodiment of the present invention;

FIG. 5G illustrates a perspective view of a winch for the canopy lifting mechanism of one embodiment of the present invention;

FIG. 5H illustrates a perspective view of a pulley mount for the canopy lifting mechanism of one embodiment of the present invention;

DETAILED DESCRIPTION OF THE PREFERRED EMBODIMENT

Figure 1E:
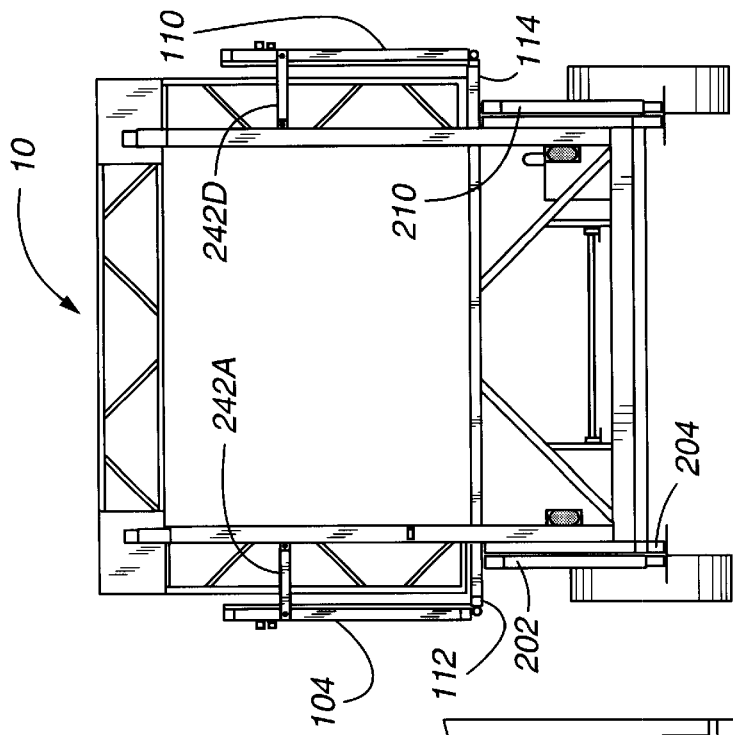
FIG. 1E illustrates a rear view of the embodiment of the present invention shown in FIG. 1A.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

FIG. 1A illustrates a perspective view of the portable stage 10 of the present invention wherein the portable stage 10 is in a transport configuration. Similarly, FIGS. 1B, 1C, 1D and 1E are first side, second side, front and rear views, respectively, of the portable stage 10 in a transport configuration. With reference to FIGS. 1A–1E, the portable stage 10 includes a trailer portion 20 and a stage portion 30, wherein the stage portion 30 is integrated with the trailer portion 20.

The trailer portion 20 includes a chassis 22, wheels 24 and a trailer tongue 26. The wheels 24 are rotatably mounted to the chassis 22, as is common with towable trailers. The trailer tongue 26 is mounted to the chassis 22 to permit the portable stage 10 to be towed by a vehicle (not shown). Preferably, the components of the portable stage 10 are lightweight, allowing the portable stage 10 to be towed by a sport-utility vehicle or a pick-up truck. For example, many components may be made with 6061 aircraft aluminum or other lightweight materials.

The stage portion 30 includes a floor assembly 100, a floor deployment assembly 200, a canopy assembly 300, and a canopy lifting assembly 400. The floor assembly 100 includes main floor panel 102, first floor panel 104, second floor panel 106, third floor panel 108 and fourth floor panel 110. The main floor panel 102 is preferably fixedly attached to chassis 22 and preferably spans over the entire top surface area of chassis 22. The main floor panel 102 has first side 112, second side 114, first end 116 and second end 118.

The first and second floor panels 104, 106 are preferably hingeably attached to main floor panel 102 along first side 112 of the main floor panel 102. Preferably, the combined length of first and second floor panels 104, 106 is approximately equal to a distance from the first end 116 to the second end 118 of main floor panel 102. Furthermore, a first dowel 120, preferably having a length approximately equal to the distance from the first end 116 to the second end 118 of main floor panel 102, is advantageously used to form part of the hingeable connection between main floor panel 102 and first and second floor panels 104, 106, which assists the first and second floor panels 104, 106 in being in alignment with one another when deployed. As will be understood by those skilled in the art, the remainder of the hingeable connection is conventional.

Similarly, the third and fourth floor panels 108, 110 are preferably hingeably attached to main floor panel 102 along second side 114 of the main floor panel 102. Preferably, the combined length of third and fourth floor panels 108, 110 is approximately equal to a distance from the first end 116 to the second end 118 of main floor panel 102. Furthermore, a second dowel 122, preferably having a length approximately equal to the distance from the first end 116 to the second end 118 of main floor panel 102, is advantageously used to form part of the hingeable connection between main floor panel 102 and third and fourth floor panels 108, 110, which assists the third and fourth floor panels 108, 110 in being in alignment with one another when deployed. As will be understood by those skilled in the art, the remainder of the hingeable connection is conventional.

The floor deployment assembly 200 preferably includes first stabilizer beam 202, second stabilizer beam 204, third stabilizer beam 206, fourth stabilizer beam 208, fifth stabilizer beam 210, sixth stabilizer beam 212, seventh stabilizer beam 214 and eighth stabilizer beam 216. Each of the stabilizer beams 202–216 are preferably pivotally connected to chassis 22 by their respective first ends 218A–218H (only first end 218A of first stabilizer beam 202 is identified in FIG. 1B). Further, each of the stabilizer beams 202–216 preferably has a stabilizer jack 220A–220H (only first stabilizer jack 220A is identified in FIG. 1B) either integral with, or connected to, its respective second end 222A–222H (only second end 222A of first stabilizer beam 202 is identified in FIG. 1B).

Preferably, pairs of stabilizer beams (e.g., first and second stabilizer beams 202,204; third and fourth stabilizer beams 206, 208; etc.) are designed to be folded under the main floor panel 102 when the portable stage 10 is in its transport configuration. Furthermore, preferably, one of the stabilizer beams in the pair of stabilizer beams is designed to fold over the other stabilizer beam. Safety cables (not shown), which are attached to the chassis 22 in a conventional manner, are preferably used to ensure that the pairs of stabilizer beams remain folded under the main floor panel 102 during transport of the portable stage 10.

Figure 2A:
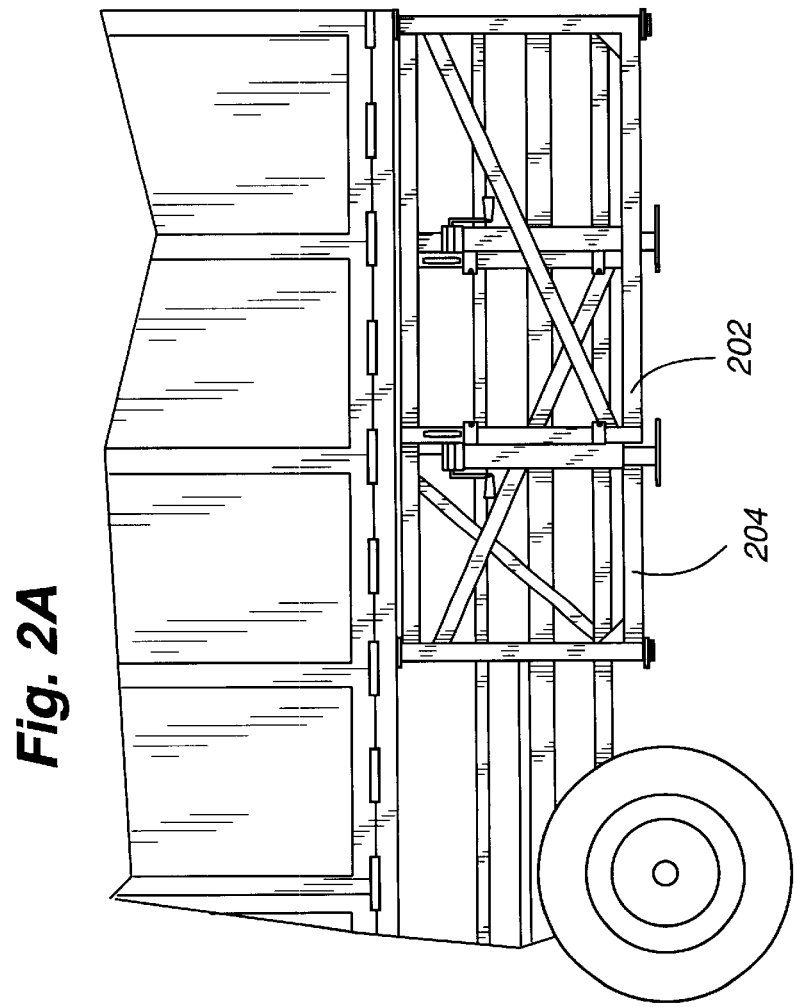
FIG. 2A illustrates a partial sectional view of FIG. 1A illustrating two of the stabilizer beams when the portable stage is in its transport configuration.

FIGS. 1E and 2A illustrate a pair of stabilizer beams (e.g., first and second stabilizer beams 202, 204) which are folded under main floor panel 102. When deploying the first and second stabilizer beams 202, 204, the safety cable (not shown) is disconnected and the first and second stabilizer beams 202, 204 are pivoted so that they are perpendicular to first side 112 of main floor panel 102. FIG. 2B illustrates first and second stabilizer beams 202, 204 in their deployed configuration. Preferably, each of the stabilizer beams 202–216 have a corresponding gas strut 222A–222H connected between each of the stabilizer beams 202–216 and the chassis 22 to assist in positioning the stabilizer beams 202–216 at a 90 degree angle relative to the first side 112 or second side 114 of the main floor panel 102. Gas strut 222A is shown in FIG. 2C.

As shown in FIG. 2D, the stabilizer jack 220A of first stabilizer beam 202 includes a pad 224A with a telescoping leg 226A. A pin 228A is used to coarsely adjust the telescoping leg 226A using a preset number of apertures 230A in the leg 226A. When deploying the first stabilizer beam 202, after the first stabilizer beam 202 has been positioned, the pin 228A is removed from the first stabilizer jack 220A. The pad 224A is then placed as close to the ground as possible and the pin 228A is replaced in one of a preset number of apertures 230A in the leg 226A. A handle 232A, which used to finely adjust the telescoping leg 226A, is then rotated until the pad 224A contacts the ground.

A similar process is repeated for each of the other stabilizer beams 204–216, as will be understood by those skilled in the art. In fact, the preferred configuration of the other stabilizer beams 204–216 is similar to that described in connection with FIG. 2D. Accordingly, for brevity and to avoid confusion, the specifics of each of the other stabilizer beams will not be described herein.

In order to ensure that the portable stage 10 is level, the stabilizer jacks located at the four corners of the portable stage 10 (e.g., first, fourth, fifth and eighth stabilizer jacks 202, 208, 210 and 216) are raised by their handles first. First and second level bubbles 234, 236, preferably located on a fixed portion of the canopy lifting assembly 400 (see FIG. 3A), may be used to ensure that the floor assembly 100 is level both front-to-back and side-to-side. Third and fourth level bubbles 238, 240, which also may be used to ensure that the floor assembly 100 is level, are preferably located on a fixed portion of the canopy lifting assembly 400 near the corner of the main floor panel 102 which is diagonal to the corner shown in FIG. 3A. Once the stage has been leveled, the handles of the remaining stabilizer jacks are rotated such that they bear part of the load but without causing the floor assembly 100 to become uneven.

FIG. 3A (in addition to illustrating the level bubbles 234, 236) illustrates a first (242A) of four floor panel locking members 242A–242D and illustrates the first floor panel 104. The first floor panel locking member 242A shown in FIG. 3A is pivotally connected to a fixed portion of canopy lifting assembly 400, so that it pivots to an approximately vertical position once it is detached from the first floor panel 104. A bolt is fixed to the side of first floor panel 104 and a nut is used to fix the panel locking member 242A to the panel 104 so that the first floor panel 104 is held in a vertical configuration during transport. Similar components are used for the second, third and fourth floor panels 106, 108, 110, as will be understood by those skilled in the art.

FIG. 3A also illustrates a first stabilizing pin 244A and a first weight distribution foot 246A. The first stabilizing pin 244A is designed to be received by aperture 248A (see FIG. 2D) in first stabilizer beam 202 to assist in stabilizing first floor panel 104 relative to stabilizer beam 202. First weight distribution foot 246A distributes some of the weight of the first floor panel 104 onto the first stabilizer beam 202. First weight distribution foot 246A also operates as a shim between first floor panel 104 and stabilizer beam 202. Preferably, first weight distribution foot takes the form of a cylindrically-shaped rubberized material. As will be understood by those skilled in the art, there are similar components for the other stabilizer beams. For brevity and clarity, the components which correspond with the other stabilizer bars will not be discussed.

To illustrate the final steps in deploying the floor assembly 100 of the portable stage 10, FIG. 3B provides a perspective view of the portable stage 10 when three of the four floor panels are in their deployed configuration.

After all four of the floor panels are placed in their deployed configuration, the present invention provides a mechanism for joining floor panels on the same side of the main floor panel 102. Specifically, FIG. 3C illustrates a partial perspective view of the first and second floor panels 104, 106, wherein first floor panel joiner bar 250A is attached to second floor panel 106. FIG. 3D is a view similar to that of FIG. 3C and illustrates a partial perspective view of the first and second floor panels 104, 106, wherein the first floor panel joiner bar 250A is used to join the first and second floor panels 104, 106. A second floor panel joiner bar 250B (not shown) is similarly used to join third and fourth floor panels 108, 110.

FIG. 3E illustrates a perspective view of the portable stage 10 with the floor assembly 100 deployed and the canopy assembly 300 in its transport configuration. The manner of deploying the canopy assembly 300 will be discussed starting with reference to FIG. 3E.

The canopy assembly 300 includes a main canopy panel 302, a first canopy panel 304 and a second canopy panel 306. The first and second canopy panels 304, 306 are deployed in a series of steps and then the canopy assembly 300 is lifted to its fully-deployed position.

In order to deploy the first and second canopy panels 304, 306, the canopy assembly 300 is raised off of the main floor panel 102, while the first and second canopy panels 304, 306 otherwise remain in their transport configuration. The purpose of raising the canopy assembly 300 off of the main floor panel 102 is to provide clearance from the main floor panel 102 so that the first and second canopy panels 304, 306 may be rotated from their transport configuration to their deployed configuration. The first canopy panel 304 is rotated about first canopy pivot shaft 308 (see also FIG. 3A), while second canopy panel 306 is rotated about second canopy pivot shaft 310.

To raise the canopy assembly 300 off of the main floor panel 102, winch handle 403 is rotated a sufficient number of times to permit rotation of the first and second canopy panels 304, 306 about their respective canopy pivot shafts 308, 310 without obstruction by the main floor panel 102.

The main canopy panel 302 has first through eighth canopy panel securement plates 312A–312H attached to (preferably, integral with) it. Each of the canopy panel securement plates 312A–312H has a corresponding securement plate deployment aperture 314A–314H (see securement plate deployment aperture 314B for second canopy panel securement plate 312B in FIG. 4C). Further, each of the canopy panel securement plates 312A–312H has a corresponding latch pin 313A–313H hanging from it by a corresponding latch pin chain 315A–315H. The securement plate deployment apertures 314A–314H, in combination with the latch pins 313A–313H, are used to hold first and second canopy panels 304, 306 in a deployed position. Preferably, second, third, sixth and seventh canopy panel securement plates 312B, 312C, 312E, 312F correspondingly have first, second, third and fourth spring-pin receiving apertures 316, 318, 320, 322, which are used to hold first and second canopy panels 304, 306 in their transport configuration. FIG. 4B (with reference to FIG. 4C) shows spring-pin receiving aperture 316 being used to hold first canopy panel 304 in its transport configuration.

Referring now to FIGS. 3E and 4A, first canopy panel 304 includes first and second spring-pin assemblies 324, 326 (only spring-pin assembly 324 is shown in FIG. 4A), while second canopy panel 306 includes third and fourth spring-pin assemblies 328, 330. First through fourth spring-pin assemblies 324, 326, 328, 330 each includes corresponding first through fourth spring pins 332, 334, 336, 338, which are biased so that they are extended (spring pin 332 is shown in FIG. 4D). A first spring-pin release wire 340 extends between the first spring-pin assembly 324 and the second spring-pin assembly 326 (see FIGS. 3E and 4A), and is used to retract first and second spring pins 332, 334. Similarly, a second spring-pin release wire 342 extends between the third spring-pin assembly 328 and the fourth spring-pin assembly 330, and is used to retract the third and fourth spring pins 336, 338. As will be understood by those skilled in the art, first and second spring-pin release wires 340, 342 are exaggerated in length in FIG. 3E (i.e., they are drooping) so that they may be more easily seen.

First through fourth spring-pin assemblies 324, 326, 328, 330 are aligned so that their respective spring pins 332, 334, 336, 338 are correspondingly aligned with first through fourth spring-pin receiving apertures 316, 318, 320, 322 when the first and second canopy panels 304, 306 are in their transport configuration. Accordingly, the spring pins and corresponding apertures hold the first and second canopy panels 304, 306 in place.

When deploying the first and second canopy panels 304, 306, spring pins are used to assist a user in getting the first and second canopy panels 304, 306 into a semi-deployed configuration (see FIG. 4D). It should be noted that each canopy panel is separately placed into its semi-deployed configuration.

Specifically, with respect to first canopy panel 304, a user pulls the first spring-pin release wire 340 thereby respectively retracting first and second spring pins 332, 334 from first and second spring-pin receiving apertures 316, 318. A force is then exerted by the user in an outward and upward direction, causing first canopy panel 304 to rotate about first canopy pivot shaft 308. While the first canopy panel 304 is being rotated, the first spring-pin release wire 340 is released by the user, causing the first and second spring pins to respectively extend (or abut) against second and third canopy panel securement plates 312B, 312C (see, e.g., FIG. 4C). The first canopy panel 304 is rotated until first and second spring pins 332, 334 are respectively advanced past outer edges 344, 346 of second and third canopy panel securement plates 312B, 312C. When this occurs, first and second spring pins 332, 334 become fully-extended. Subsequently, the first canopy panel 304 is released and the first canopy panel 304 remains in a semi-deployed configuration (shown in FIG. 4D) due to first and second spring pins 332, 334 engaging outer edges 344, 346 of second and third canopy panel securement plates 312B, 312C. A similar procedure is followed to semi-deploy the second canopy panel 306, as will be understood by those skilled in the art.

To fully-deploy the first canopy panel 304, first canopy panel 304 includes first through fourth canopy panel deployment apertures 348A–348D (second canopy deployment aperture 348B is shown in FIG. 4C), which correspond with first through fourth securement plate deployment apertures 314A–314D. Similarly, to fully-deploy the second canopy panel 306, second canopy panel 306 includes fifth through eighth canopy panel deployment apertures 348E–348H, which correspond with fifth through eighth securement plate deployment apertures 314E–314H.

With reference to the first canopy panel 304, a user simply lifts the first canopy panel 304 to its fully-deployed position and respectively inserts latch pins 313A–313D into both canopy deployment apertures 348A–348D and securement plate deployment apertures 314A–314D (see FIG. 4E). Advantageously, the first and second spring pins 332, 334 do not prevent the first canopy panel 304 from being extended to its fully-deployed position, but does prevent it from dropping below its semi-deployed position without pulling the first spring-pin release wire 340. Furthermore, the above-described technique allows a single individual to fully-deploy the canopy panels.

Figure 5A:
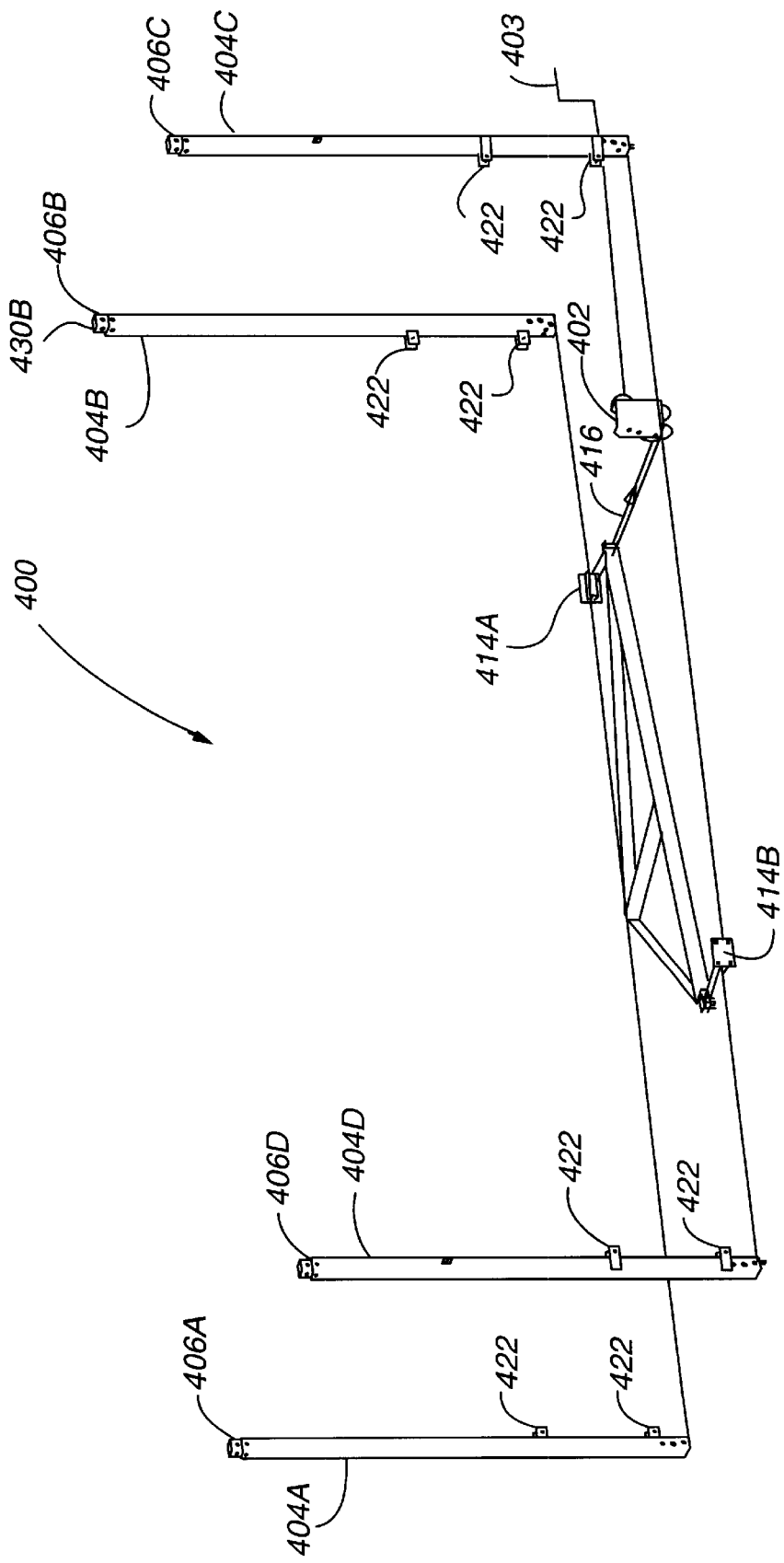
FIG. 5A illustrates a perspective view of the canopy lifting mechanism of one embodiment of the present invention, with the flooring, stabilizer beams and the chassis removed.

Now the canopy lifting mechanism 400 will be described. FIG. 5A illustrates a perspective view of the canopy lifting mechanism 400 of the portable stage 10, with the flooring, stabilizer beams and chassis removed for ease of understanding. Similarly, FIG. 5B is a top view of the canopy lifting mechanism 400 of the portable stage 100, with the flooring, stabilizer beams and chassis removed for ease of understanding.

Figure 5B:
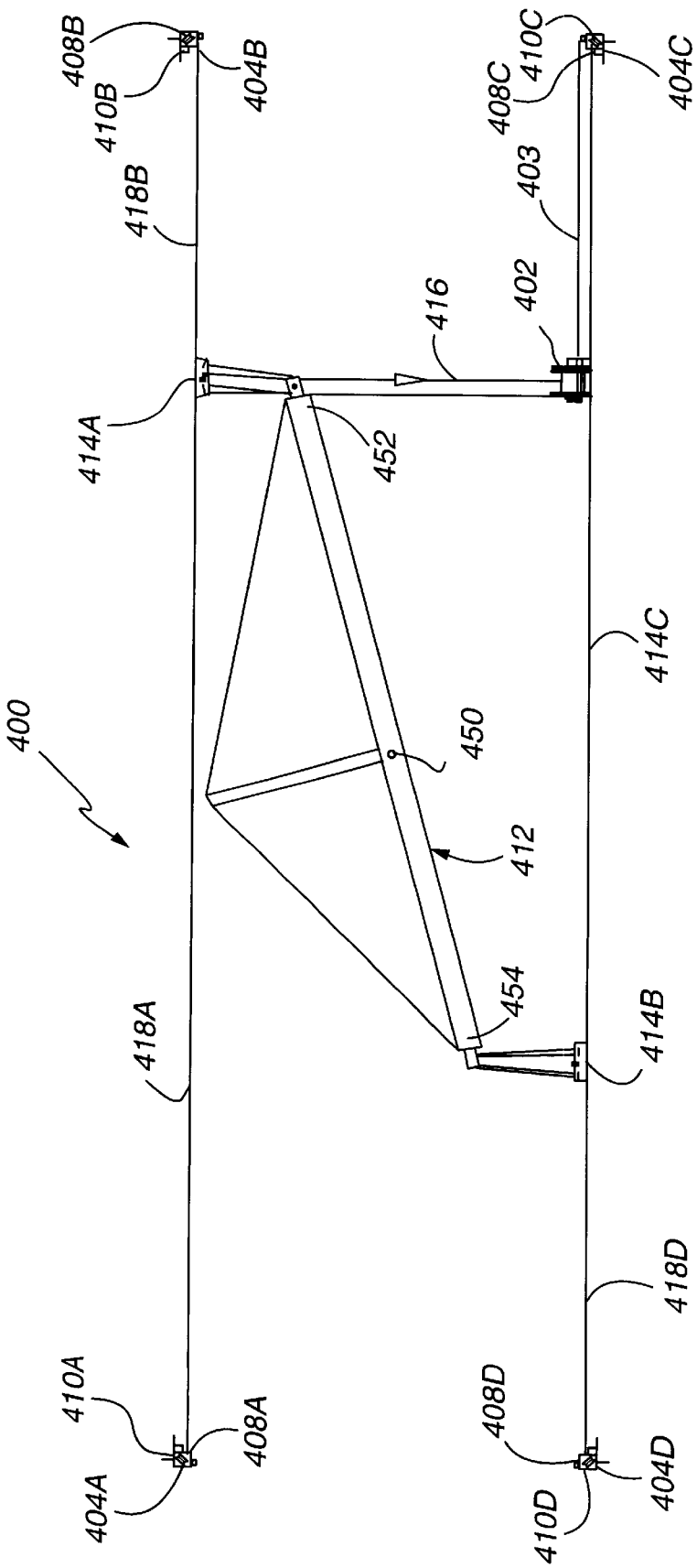
FIG. 5B illustrates a top view of the canopy lifting mechanism of one embodiment of the present invention, with the flooring, stabilizer beams and chassis removed.

With reference to FIGS. 5A and 5B, the components of the canopy lifting mechanism 400 include a winch 402 having a handle 403; first, second, third and fourth sleeve members 404A–404D; first, second, third and fourth extension beams 406A–406D; first, second, third and fourth stanchions 408A–408D (second stanchion 408B is shown more clearly in FIG. 5C); first, second, third an fourth stanchion pulleys 410A–410D (second stanchion pulley 410B is shown more clearly in FIG. 5C); a bell crank assembly 412; first and second pulley mount assemblies 414A, 414B; winch cable 416 (shown in red in FIG. 5B); first extension beam cable 418A (shown in blue in FIG. 5B); second extension beam cable 418B (shown in green in FIG. 5B); third extension beam cable 418C (shown in aqua in FIG. 5B); and fourth extension beam cable 418D (shown in magenta in FIG. 5B). In addition, the canopy lifting mechanism 400 includes first sleeve pulley 420A, second sleeve pulley 420B (shown in FIG. 5C), third sleeve pulley 420C and fourth sleeve pulley 420D.

With reference to FIGS. 5A and 5B, first, second, third and fourth sleeves 404A–404D are attached to chassis 22 via attachment members 422, which are attached to sleeves (preferably by welding) or are integral with the sleeves. Among other things, screws and bolts may be used to attached attachment members 422 to chassis 22.

First, second, third and fourth extension beams 406A–406D are sized to be received within first, second, third and fourth sleeves 404A–404D, respectively. Furthermore, first, second, third and fourth extension beams 406A–406D are connected to main canopy panel 302.

Among other things, screws and bolts may be used to attach extension beams 406A–406D to the main canopy panel 302.

Accordingly, the first, second, third and fourth sleeves 404A–404D are all fixed relative to the chassis 22 (and hence relative to main floor panel 102). Similarly, the first, second, third and fourth extension beams 406A–406D are all fixed relative to the main canopy panel 302. Since first, second, third and fourth extension beams 406A–406D lie within the first, second, third and fourth sleeve members 404A–404D, as extension beams 406A–406D are raised within the sleeve members 404A–404D, the main canopy panel 302 is lifted relative to the main floor panel 102.

Figure 5C:
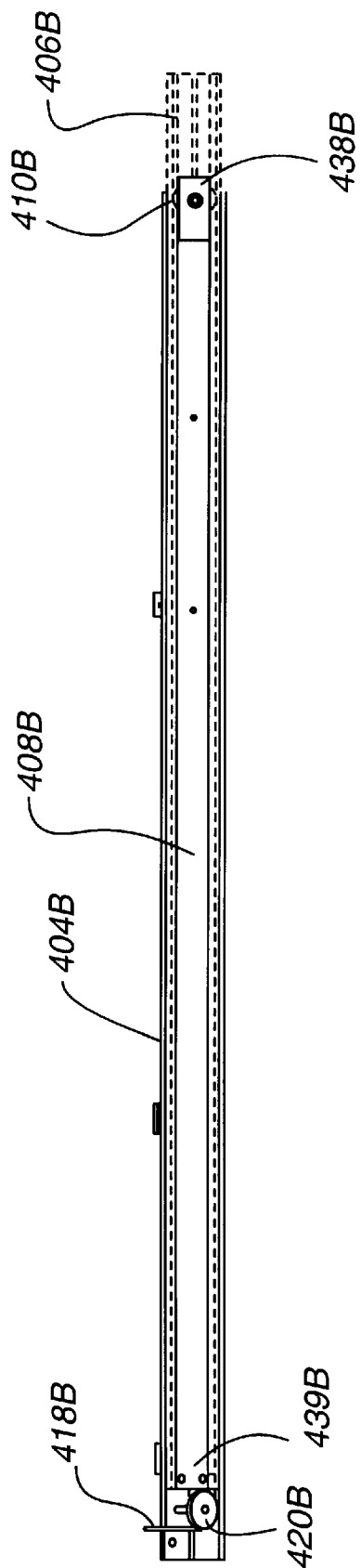
FIG. 5C illustrates a cutaway view of a sleeve and an extension beam for one embodiment of the present invention with a stanchion located within both the sleeve and the extension beam.
Figure 5D:
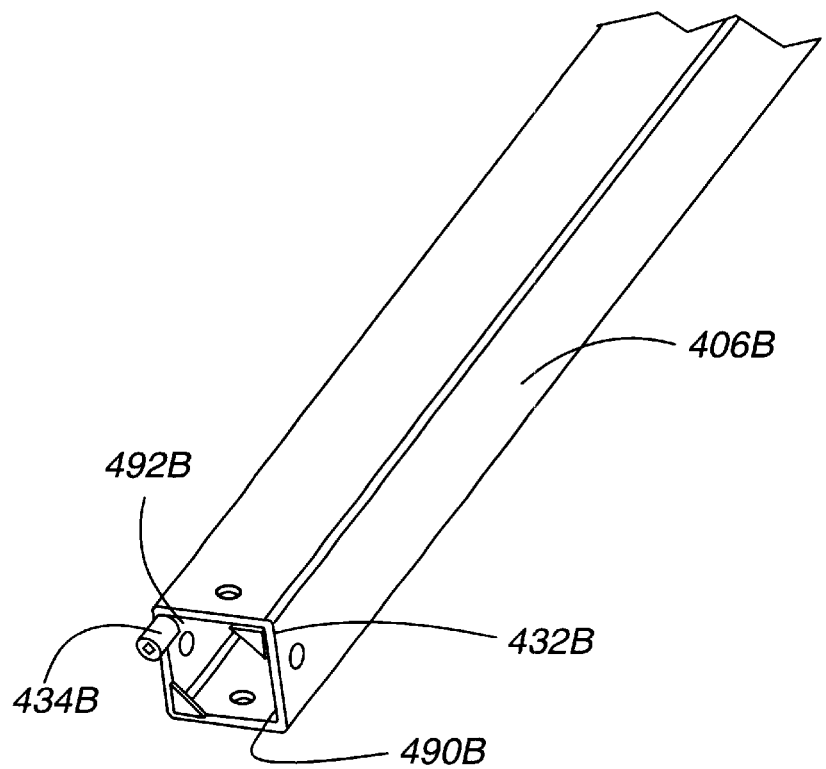
FIG. 5D illustrates a partial perspective view of one embodiment of an extension beam for the canopy lifting mechanism of one embodiment of the present invention.

FIG. 5D illustrates a partial perspective view of one of the extension beams (e.g., second extension beam 406B) of the canopy lifting mechanism 400 of the portable stage. As shown in FIG. 5D, the second extension beam 406B is a generally rectangular hollow tube. Furthermore, the second extension beam 406B has a first end 430B (which extends out of sleeve 404B in FIG. 5A) and a second end 432B (shown in FIG. 5D). The first end 430B of the second extension beam 406B extends from the second sleeve 404B when inserted therein and is connected to the main canopy panel 302. The second end 432B of the second extension beam 406B is inserted into second sleeve 404B and has a protrusion 434B that extends therefrom. Protrusion 434B is where second extension beam cable 418B is attached. As will be described in further detail below, the second extension beam cable 418B runs along the inside of a first corner 490B of second extension beam 406B (along the outside of the second stanchion 408B, which is not shown in FIG. 5D), around the second stanchion pulley 410B (not shown in FIG. 5D) and along the second corner 492B of second extension beam 406B. Ultimately, second extension beam cable 418B connects with protrusion 434B.

FIG. 5C illustrates a cutaway view of a sleeve and extension beam (e.g., second sleeve 404B and second extension beam 406B) of the present invention with a stanchion (e.g., second stanchion 408B) located within both the sleeve and the extension beam. FIG. 5C illustrates the cooperation of the second sleeve 404B (shown in black), second extension beam 406B (shown in green), second stanchion 408B (shown in blue), second stanchion pulley 410B (shown in blue), second sleeve pulley 420B (shown in black) and second extension beam cable 418B (shown in red).

Preferably, second stanchion 408B is a generally cylindrical hollow tube. Furthermore, the second stanchion 408B has a first end 438B and a second end 439B. The first end 438B of the stanchion 408B has stanchion pulley 410B attached thereto, while second end 439B of the stanchion 408B is attached to second sleeve 404B. More specifically, second end 439B of the stanchion 408B is inserted into second extension beam 406B (which has been inserted into second sleeve 404B). The second end 439B of the stanchion 408B is then attached to second sleeve 404B, preferably by screws and bolts. Importantly, the bolts used to attach the second stanchion 408B to the second sleeve 404B limit the downward travel of the second extension beam 406B, which lies in between second sleeve 404B and second stanchion 408B.

With reference to FIGS. 5C and 5D, the second extension beam cable 418B enters the second sleeve 404B via an opening (not shown) and runs around second sleeve pulley 420B, which directs second extension beam cable 418B towards first corner 490B. The second extension beam cable 418B runs along first corner 490B (i.e., from the second end 439B of the stanchion 408B to the first end 438B of the stanchion 408B) between stanchion 408B and extension beam 406B. At the first end 438B of stanchion 408B, the second extension beam cable 418B is threaded through pulley 410B, which directs second extension beam cable 418B to the second corner 492B (i.e., opposite corner) of the second extension beam 406B (see also FIG. 5B). The second extension beam cable 418B then runs from first end 438B of the stanchion 408B down to the second end 439B of stanchion 408B, along second corner 492B, between stanchion 408B and extension beam 406B. The second extension beam cable 418B is then attached to protrusion 434B at the second end 432B of extension beam 406B. Accordingly, when a force is exerted which pulls the second extension beam cable 418B through the opening near the bottom of the sleeve 404B, the second extension beam 406B is forced upward. The remaining sleeve members and their associated components operate similarly and, therefore, will not be described.

Figure 5E:
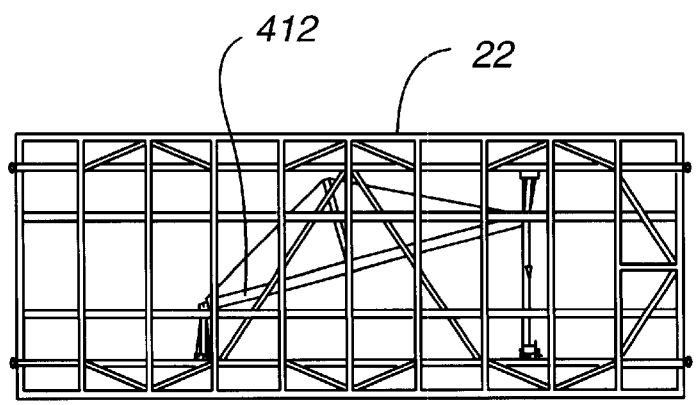
FIG. 5E is a top view, similar to FIG. 5B except that the chassis has not been removed, of the canopy lifting mechanism of one embodiment of the present invention, illustrating the preferred position of bell crank assembly relative to chassis.

Reference is now made to FIG. 5E, which is a top view (similar to FIG. 5B) illustrating the preferred position of bell crank assembly 412 relative to chassis 22. Specifically, the bell crank assembly 412 is shown to be pivotally mounted to the underside of chassis 22.

The present invention allows for the canopy to be tilted relative to the main floor panel for acoustical, lighting and drainage purposes (among other things). Specifically, the front end of the canopy (e.g., first canopy panel 304) is raised to a height above the main floor panel 102 which is greater than the back end of the canopy (e.g., second canopy panel 306). Reference is made to FIGS. 5A–5H and FIGS. 6A–6C to show the various components of the canopy lifting mechanism 400 and to show how the canopy assembly 300 is tilted using a single winch 402.

FIG. 5F is a perspective view of bell crank assembly 412. With reference to FIGS. 5B and 5F, bell crank assembly 412 is preferably pivotally attached to underside of chassis 22 at bell crank pivot 450. The bell crank assembly 412 has a first end 452 and a second end 454. Importantly, the distance D1 from bell crank pivot 450 to first end 452 is longer than the distance D2 from bell crank pivot 450 to second end 454. The difference between D1 and D2 allows the canopy assembly 300 to be tilted when raised using a single winch 402.

Winch 402 has winch cable 416 that extends around a pulley 450 at first end 452 of bell crank assembly 412 and then anchors back on the frame of the winch 402. This effectively creates what is known as a two-part line. First and second extension beam cables 418A, 418B run around pulleys in pulley block 414A and around pulleys 456 at first end 452 of bell crank assembly 412, and are anchored at pulley block 414A. Similarly, third and fourth extension beam cables 418C, 418D run around pulleys in pulley block 414B and around pulleys 458 at second end 454 of bell crank assembly 412, and are anchored at pulley block 414B.

When one turns the winch 402 by winch handle 403, the winch 402 takes up the winch cable 416 causing the bell crank assembly 412 to pivot about bell crank pivot 450 as the first end 452 of the bell crank assembly 412 moves towards winch 402. Since the bell crank pivot 450 is not centered between the first and second ends 452, 454 of the bell crank assembly 412, the first end 452 of the bell crank assembly 412 will move a greater distance than second end 454 of bell crank assembly 412. Accordingly, first and second extension beams 406A, 406B (i.e., the beams for the front end of canopy) will be raised higher than third and fourth extension beams 406C, 406D (i.e., the beams for the back end of the canopy), since proportionately more cable will be drawn by the first end 452 of the bell crank assembly 412 relative to the second end 454 of the bell crank assembly 412.

As will be understood by those skilled in the art, the connection between the extension beams and the main canopy panel must be a pivoted connection, since the front end is raised higher than the back end. An accommodation must also be made for the variation in distance between the first end 430A of first extension beam 406A and the first end 430D of fourth extension beam 406D. Likewise, an accommodation must also be made for the variation in distance between the first end 430B of the second extension beam 406B and the first end 430C of the third extension beam 406C.

Figure 6A:
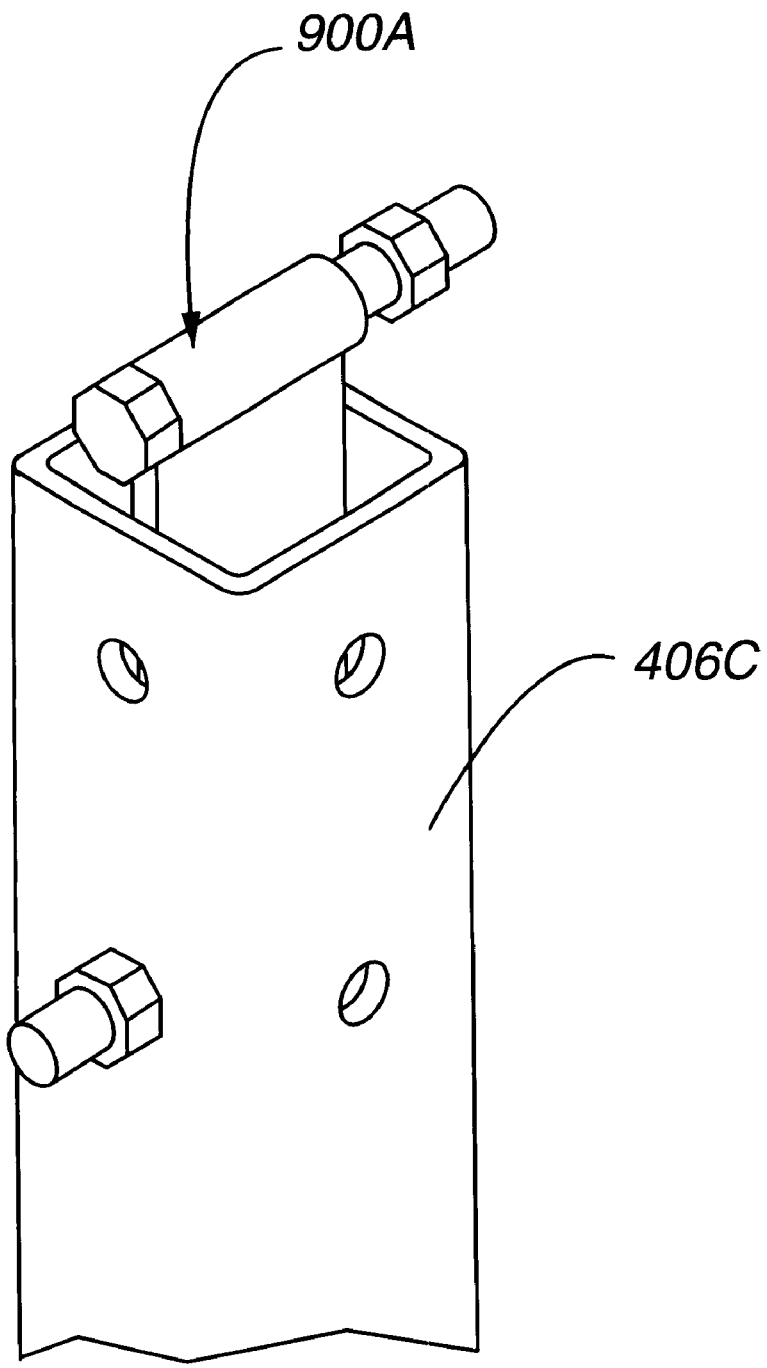
FIG. 6A illustrates a perspective view of a floating pivot for one embodiment of the present invention, wherein the floating pivot is pivotally attached to an extension beam.
Figure 6B:
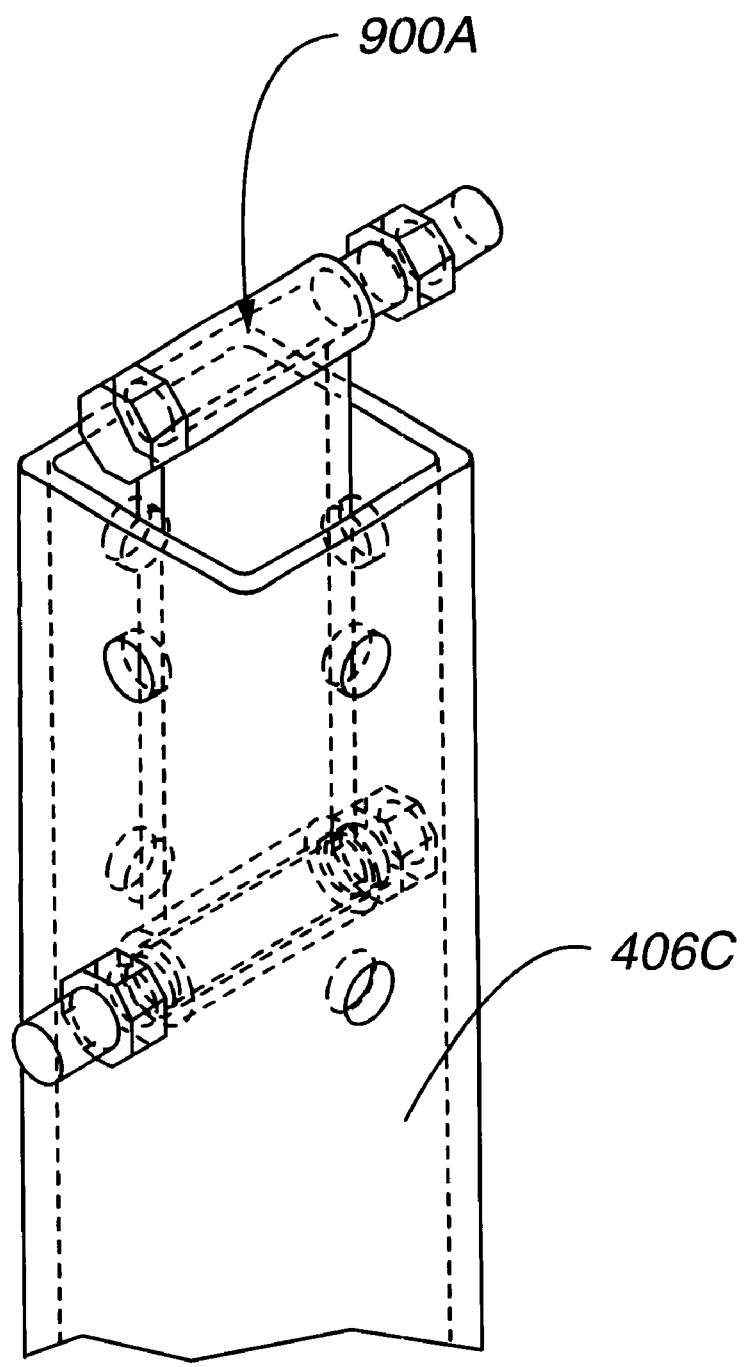
FIG. 6B is a phantom view similar to FIG. 6A.
Figure 6C:
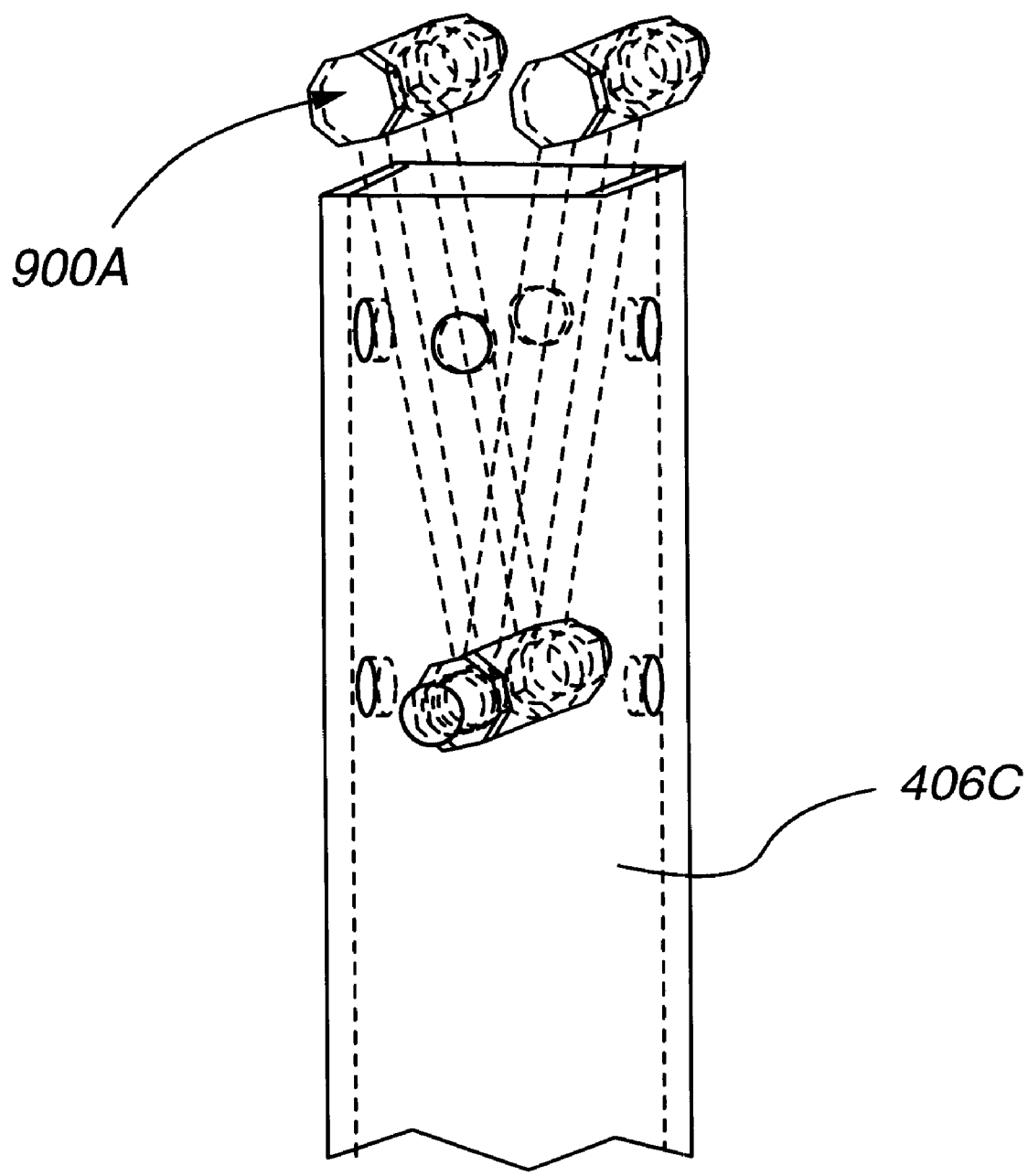
FIG. 6C is a phantom view similar to FIG. 6B, which illustrates two possible positions of many possible positions of the floating pivot.

FIGS. 6A–6C illustrate a floating pivot 900A, which accommodates the variations in distance between the first end 430B of the second extension beam 406B and the first end 430C of the third extension beam 406C. (There is a similar floating pivot 900B, which accommodates the variations in distance between the first end 430A of the first extension beam 406A and the first end 430D of the fourth extension beam 406D.) Specifically, FIG. 6A illustrates a perspective view of the floating pivot 900A, wherein floating pivot 900A is pivotally attached to third extension beam 406C. (Similarly, a floating pivot 900B is pivotally attached to fourth extension beam 406D.) FIG. 6B is a phantom view similar to FIG. 6A. FIG. 6C is a phantom view similar to FIG. 6B, which illustrates two possible positions of the floating pivot 900A.

In addition to being pivotally attached to third extension beam 406C, the floating pivot 900A is attached to main canopy panel 302. Accordingly, when main canopy panel 302 is tilted relative to main floor panel 102, floating pivot 900A pivots about its pivotal connection to third extension beam 406C as will be understood from viewing FIG. 6C. Similarly, when main canopy panel 302 is tilted relative to main floor panel 102, floating pivot 900B pivots about its pivotal connection to fourth extension beam 406D.

As will be understood by those skilled in the art, a two-part line allows the effective length of travel of the first and second ends 452, 454 of the bell crank assembly 412 to be doubled with respect to linear cable take up at the extension beams 406A–406D.

It should be noted that small nylon tabs (not shown) may be placed on the inside walls of the sleeve near its first end and on the outside walls of the extension beam near its second end. The nylon tabs act as a bearing surface to prevent metal-to-metal contact between the tubes.

Figure 7:
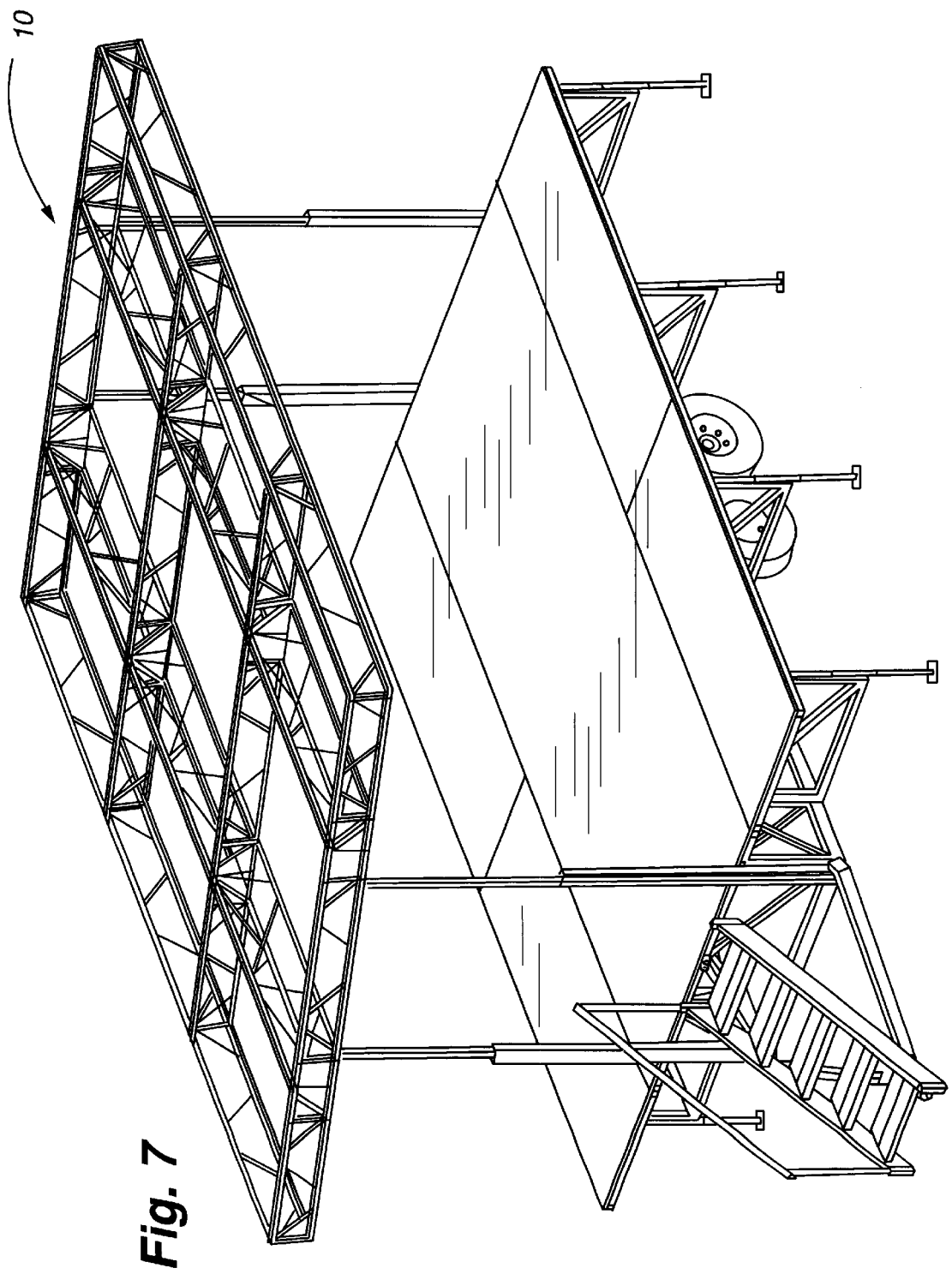
FIG. 7 illustrates a perspective view of one embodiment of the portable stage of the present invention in its fully-deployed configuration; and, FIG. 8 illustrates a side view of one embodiment of the portable stage of the present invention in its fully-deployed configuration.
Figure 8:
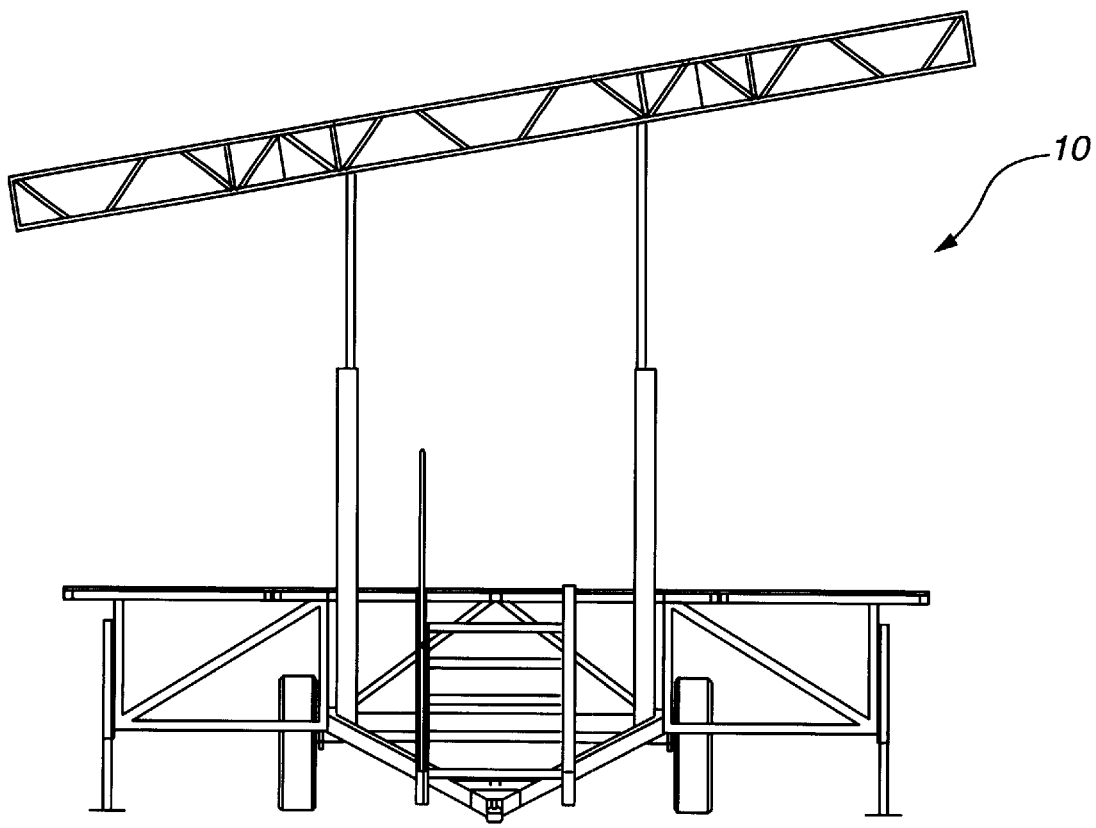

Although such components are well known, FIG. 5G is provided to illustrate a perspective view of winch 402 and FIG. 5H is provided to illustrate a perspective view of pulley mount 414A, 414B. Once the portable stage has been fully-deployed, it may look similar to the illustration shown in FIGS. 7 and 8.

It should be understood that modifications may be made to the invention without departing from the spirit of the invention. Specifically, among other things, the invention is not intended to be limited to a portable stage with four hinged floor panels, two rotatable canopy panels, eight pivotal stabilizer beams and four pivotal locking members. Instead, more or less floor panels, canopy panels, stabilizer beams and locking members may be used without departing from the scope of the invention. In addition, variations to these or other components may be made without departing from the scope of the invention.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A portable stage having at least a transport configuration and a deployed configuration, said portable stage comprising:

a chassis having wheels rotatably attached thereto;

a main floor panel attached to said chassis;

first and second deployable floor panels pivotally attached to said main floor panel;

a deployable canopy attached to said chassis, wherein said deployable canopy is stored between said first and second floor panels when said portable stage is in said transport configuration.

2. The portable stage of claim 1 wherein the deployable canopy has a main canopy panel, first canopy panel and second canopy panel, and wherein the first and second canopy panels are substantially parallel to first and second floor panels when said portable stage is in said transport configuration.

3. The portable stage of claim 2 wherein the first and second canopy panels are stored in a substantially vertical direction when said portable stage is in said transport configuration, and wherein said first and second canopy panels each have a vertical height and said first and second floor panels have a vertical height, said vertical height of the first and second canopy panels being greater than the vertical height of the first and second floor panels.

4. The portable stage of claim 1 wherein a first sleeve is used to attach said canopy to said chassis, said first sleeve having a first panel locking member attached thereto and wherein said first panel locking member is removably attached to said first panel to hold the first panel in a non-deployed position when said stage is in its transport configuration.

5. The portable stage of claim 1 wherein said first floor panel, said second floor panel and said main floor panel form a main stage when said first and second floor panels are deployed, and wherein said canopy substantially entirely covers said main stage when said canopy is deployed.

6. A portable stage having at least a transport configuration and a deployed configuration, said portable stage comprising:

a chassis having wheels rotatably attached thereto;

a main floor panel attached to said chassis;

first and second deployable floor panels pivotally attached to said main floor panel;

a deployable canopy attached to said chassis, said canopy including a main canopy panel, a first canopy panel and a second canopy panel, wherein said first and second canopy panels are pivotally connected to said main canopy panel and wherein said first and second canopy panels respectively have first and second spring pins, said main canopy panel including first and second canopy panel securement plates which cooperate with first and second spring pins.

7. The portable stage of claim 6 wherein said first and second canopy panel securement plates respectively include first and second spring-pin receiving apertures which cooperate with first and second spring pins to respectively lock first and second canopy panels in their transport configuration.

8. The portable stage of claim 7 wherein a spring-pin release wire extends between said first and second spring pins, said spring-pin release wire being used to retract the first and second spring pins so that the first and second canopy panels may be unlocked.

9. The portable stage of claim 6 wherein said first and second canopy panel securement plates each have an edge, said edge of said first canopy panel securement plate cooperating with the first spring pin to permit said first canopy panel to be placed in a semi-deployed configuration.

10. The portable stage of claim 9 wherein said first canopy panel securement plate has a first securement plate deployment aperture and a corresponding first latch pin, and wherein said first canopy panel has a first canopy panel deployment aperture, said first latch pin being receivable by said first securement plate deployment aperture and said first canopy panel deployment aperture to place said first canopy panel in a fully-deployed configuration.

11. The portable stage of claim 10 wherein said first latch pin is secured to said first canopy panel securement plate by a first latch pin chain.

12. A portable stage having at least a transport configuration and a deployed configuration, said portable stage comprising:

a chassis having wheels rotatably attached thereto;

a main floor panel attached to said chassis;

first and second deployable floor panels pivotally attached to said main floor panel; and, a deployable canopy attached to said chassis, wherein first and second stabilizer beams are pivotally attached to said chassis and are stored under said main floor panel when said portable stage is in its transport configuration.

13. The portable stage of claim 12 wherein said first floor panel includes a stabilizing pin and wherein said first stabilizer beam may be deployed by being pivoted out from under said main floor panel, said first stabilizer beam having an aperture therein to receive said stabilizing pin when said first floor panel and said first stabilizer beam are deployed.

14. The portable stage of claim 13 wherein said first floor panel includes a first weight distribution foot proximate said stabilizing pin, said first weight distribution foot engaging said first stabilizer beam when said floor panel and said first stabilizer beam are deployed and being used to manage placement of said stabilizing pin in said aperture.

15. The portable stage of claim 12 wherein said first stabilizer beam may be deployed by being pivoted out from under said main floor panel, and wherein a first gas strut is connected between said chassis and said first stabilizer beam to assist in positioning the first stabilizer beam into a deployed position.

16. The portable stage of claim 12 wherein the first stabilizer beam includes a first stabilizer jack, said first stabilizer jack being used to raise the main floor panel, and wherein at least one level bubble is provided and is fixed relative to the main floor panel so that the floor panel may be leveled through use of said first stabilizer jack and said level bubble.

17. A portable stage having at least a transport configuration and a deployed configuration, said portable stage comprising:

a chassis having wheels rotatably attached thereto;

a main floor panel attached to said chassis;

first and second deployable floor panels pivotally attached to said main floor panel;

a deployable canopy having a main canopy section, which may be lifted relative to the main floor panel;

first, second, third and fourth sleeves fixedly secured to said chassis, wherein said first, second, third and fourth sleeves respectively receive first, second, third and fourth extension beams which are fixedly secured to said main canopy panel.

18. The portable stage of claim 17 wherein said first, second, third and fourth extension beams permit said main canopy panel to be parallel to said main floor panel when in a transport configuration and tilted relative to said main floor panel when in a deployed configuration.

19. The portable stage of claim 18 wherein a bell crank assembly is pivotally connected to chassis and a winch is connected to said bell crank assembly by a winch cable, and wherein first, second, third and fourth extension beam cables respectively connect bell crank assembly to first, second, third and fourth extension beams.

20. The portable stage of claim 19 wherein said winch may be rotated to cause a first end of the bell crank assembly to be drawn towards the winch via winch cable.

21. The portable stage of claim 20 wherein the pivotal connection between said chassis and said bell crank assembly defines a bell crank pivot and a first distance between said bell crank pivot to the first end of said bell crank assembly is greater than a second distance between said bell crank pivot and a second end of said bell crank assembly.

22. The portable stage of claim 1 wherein the canopy is attached to the chassis in the absence of a direct pivotal connection between the chassis and any one of the main floor panel, the first floor panel and the second floor panel.

23. The portable stage of claim 12 wherein said first and second stabilizer beams are deployed prior to deploying first floor panel.

24. The portable stage of claim 23 wherein the first and second stabilizer beams are manually deployed.

25. The portable stage of claim 24 wherein the first floor panel is manually deployed.

26. The portable stage of claim 12 wherein the first floor panel engages said first stabilizer beam when the first floor panel has been deployed and disengages the first stabilizer beam when placed in a transport configuration.

* * * * *